United States Patent
Tong et al.

(10) Patent No.: US 10,291,317 B2
(45) Date of Patent: May 14, 2019

(54) DUAL-BAND COMMUNICATION SATELLITE SYSTEM AND METHOD

(71) Applicant: Asia Satellite Telecommunications Company Limited, Wanchai (HK)

(72) Inventors: Roger Shun Hong Tong, New Territories (HK); Fred Chun Yin Vong, New Territories (HK); Harry Yin Chung Leung, New Territories (HK); Hai Hu, New Territories (HK); Man Hei Chan, New Territories (HK); Kat Fan Yip, New Territories (HK)

(73) Assignee: Asia Satellite Telecommunications Company Limited, Wanchai (HK)

( * ) Notice: Subject to any disclaimer, the term of this patent is extended or adjusted under 35 U.S.C. 154(b) by 155 days.

(21) Appl. No.: 15/259,911

(22) Filed: Sep. 8, 2016

(65) Prior Publication Data
US 2018/0069621 A1    Mar. 8, 2018

(51) Int. Cl.
*H04B 7/185*    (2006.01)
*H04B 7/204*    (2006.01)

(52) U.S. Cl.
CPC ....... *H04B 7/2041* (2013.01); *H04B 7/18513* (2013.01)

(58) Field of Classification Search
CPC . H04B 7/2041; H04B 7/18513; H04W 72/04; H04W 72/0453
See application file for complete search history.

(56) References Cited

U.S. PATENT DOCUMENTS

| 7,034,711 B2 | 4/2006 | Rao et al. | |
|---|---|---|---|
| 2001/0036826 A1* | 11/2001 | Norin | H04B 7/18523 455/429 |
| 2004/0072561 A1* | 4/2004 | LaPrade | H04B 7/18582 455/427 |
| 2009/0009404 A1* | 1/2009 | Buer | H01Q 3/2658 343/700 MS |
| 2009/0309801 A1 | 12/2009 | Rao et al. | |
| 2010/0149061 A1* | 6/2010 | Haziza | H01Q 13/0233 343/779 |

(Continued)

OTHER PUBLICATIONS

Intelsat EpicNG, "The Intelsat EpicNG Platform: High Throughput, High Performance to Support Next-Generation Requirements," http://www.intelsat.com/wp-content/uploads/2016/03/Intelsat-Epic-Positioning-6493-wp.pdf, Mar. 2016, 4 pages.

(Continued)

*Primary Examiner* — Chi Ho A Lee
(74) *Attorney, Agent, or Firm* — Hanley, Flight & Zimmerman, LLC

(57) ABSTRACT

Dual-band satellite communication systems and methods are described. A dual-band satellite communication system is described with an array of feeds. The array includes single band feeds and one or more multi-band feeds. The multi-band feeds provide dual-band spot beams. Dual-band spot beams include a first frequency band spot beam and a second frequency band spot beam. A spot beam layout may be provided when a shared reflector for the array of feeds is provided. The first frequency band beamwidth may be smaller than a second frequency band beamwidth and the number of multi-band feeds in the array of feeds may be less than the number of single band feeds.

24 Claims, 21 Drawing Sheets

(56) References Cited

U.S. PATENT DOCUMENTS

| | | |
|---|---|---|
| 2011/0032173 A1* | 2/2011 | Chang ............... H01Q 3/04 |
| | | 343/880 |
| 2011/0036826 A1* | 2/2011 | Feng ............... F24C 7/06 |
| | | 219/409 |
| 2016/0211908 A1* | 7/2016 | Noerpel ............ H04B 7/18506 |
| 2017/0214455 A1* | 7/2017 | Mendelsohn ...... H04B 7/18513 |
| 2017/0256864 A1* | 9/2017 | Jensen ............ H01Q 5/55 |
| 2017/0288769 A1* | 10/2017 | Miller ............ H04B 7/212 |
| 2018/0041270 A1* | 2/2018 | Buer ............ H04B 7/2041 |
| 2018/0069629 A1* | 3/2018 | Turgeon ............ H04B 10/118 |

OTHER PUBLICATIONS

Ipstar, ISPTAR Broadband Satellite Operator, http://www.ipstar.com/en/footprint.html, accessed Jul. 2016, 1 page.
European Space Agency (ESA), "Multi-Frequency Feeds", https://artes.esa.int/projects/multi-frequency-feeds, Nov. 30, 2010, 4 pages.

* cited by examiner

DUAL-BAND COMMUNICATION SATELLITE SYSTEM AND METHOD

TECHNICAL FIELD

The present application relates to satellite communications, and more particularly to methods and systems for providing dual-band satellite coverage for a satellite coverage perimeter.

BACKGROUND

A communication satellite may be equipped with multiple communication payloads. For example, a communication satellite may be equipped with a C-band frequency payload, a Ku-band frequency payload, and a Ka-band frequency payload. Each payload may include a transmitting/receiving (Tx/Rx) antenna subsystem and associated receivers, multiplexers, high power amplifiers (HPA), and redundancy networks for the respective frequency band. In some communication satellites, multiple Tx/Rx antenna subsystems for desired frequency bands may be integrated into a single Tx/Rx antenna subsystem. That is, the integrated Tx/Rx antenna subsystem may include an array of multi-band feeds for providing multi-band satellite coverage.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
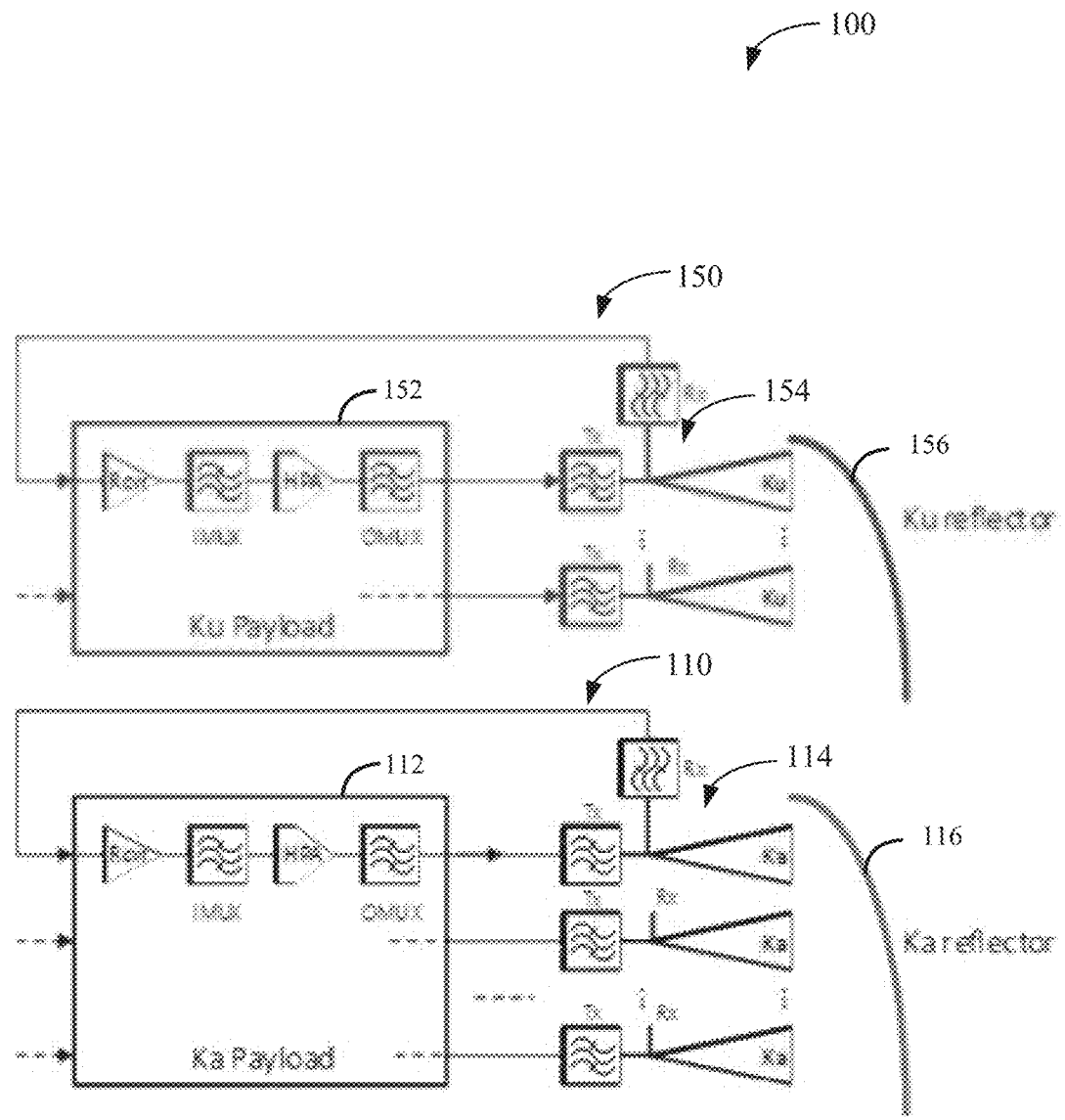
FIG. 1 is a block diagram of a conventional dual-band communication satellite system.

In one aspect, the present application describes a satellite system for providing dual-band satellite coverage using a spot beam layout for a satellite coverage perimeter. The system includes an array of feeds. The array includes a plurality of single band feeds. The single band feeds generate first frequency band spot beams. The array also includes one or more multi-band feeds each generating a first frequency band spot beam and a second frequency band spot beam concentric with the first frequency band spot beam. The first frequency band spot beam may have a different beamwidth than the second frequency band spot beam. The number of multi-band feeds may be different than the number of single band feeds. The system includes a shared reflector for the array of feeds.

In another aspect, the present application describes a method for providing dual-band satellite coverage using a spot beam layout for a satellite coverage perimeter. The method includes determining a reflector size for an array of feeds. The array may generate first frequency band spot beams. Each first frequency band spot beam may have a first beamwidth. The method also includes configuring the array to include single band feeds to generate the first frequency band spot beams for the satellite coverage perimeter. Based on the determined reflector size, the method also includes determining a second beamwidth for second frequency band spot beams. The second beamwidth may be different than the first beamwidth. The method also includes allocating one or more feeds in the array as multi-band feeds to generate dual-band spot beams. Each of the dual-band spot beams may include a first frequency band spot beam and a second frequency band spot beam concentric with the first frequency band spot beam. The number of multi-band feeds may be different than the number of single band feeds.

Other example embodiments of the present disclosure will be apparent to those of ordinary skill in the art from a review of the following detailed description in conjunction with the drawings.

Example embodiments of the present disclosure are not limited to any particular type of satellite or antenna.

Satellite Overview

Satellites are devices positioned in orbital space that are used for various purposes. In one example embodiment, the satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the satellites have a circular orbit above the Earth's equator and follow the direction of the Earth's rotation. A satellite in such an orbit has an orbital period equal to the Earth's rotational period, and accordingly may appear at a fixed position in the sky for ground stations.

Communication satellites are typically spaced apart along the geostationary orbit. That is, the satellites are positioned in orbital slots. The satellite operators coordinate their use of orbital slots with each other under international treaty by the International Telecommunication Union (ITU), and the separation between slots depends on the coverage and frequency of operation of the satellites. For example, in at least some example embodiments, the separation between satellites may be between 2-3 degrees of orbital longitude. In at least some example embodiments, the separation between satellites may be less than 2 degrees of separation. The separation of satellites in such a manner allows for frequency reuse for both uplink and downlink transmission. For example, by separating adjacent satellites by a distance greater than the transmitting beamwidth (i.e., the angle, measured in a horizontal plane, between the directions at which the power of the beam is at least one-half its maximum value) of an antenna associated with the ground station for uplink transmission, the same frequency for the communication signals may be employed to uplink to adjacent satellites with interference at or below the coordinated level. Similarly, if the separated distance between the adjacent satellites is greater than the receiving beamwidth of the antenna associated with the ground station for downlink transmission, the same frequency for the communication signals may be employed to downlink from adjacent satellites with interference at or below the coordinated level.

In order to perform communication functions, the satellite is equipped with various components. For example, the satellite may include a communication payload (which may further include transponders, one or more antennas, and switching systems), engines (to bring the satellite to the desired orbit), tracking and stabilization systems (used to orient the satellite and to keep the satellite in the correct orbit), power subsystems (to power the satellite) and command and control subsystems (to maintain communication with ground control stations).

The transponder of the satellite forms a communication channel between two end-points to allow for communications between the two end-points. The transponder also defines the capacity of the satellite for communications.

The antenna of the satellite transmits and receives communication signals. More specifically, the antenna is an electronic component that converts electric currents (which may be generated by a transmitter) to propagating radio frequency (RF) signal during transmission, and converts induced RF signals to electric currents during reception. In at least some example embodiments, the antenna may be associated with an amplifier which may amplify the power of the transmitted or received RF signals.

The communication signals may be microwave signals. Microwave signals are RF signals that have wavelengths ranging from as long as one meter to as short as one millimeter. Equivalently, the frequency of the RF signals may range from 300 MHz to 300 Ghz. More particularly, the communication signals are within certain frequency bands of microwave signals as they are more suited for satellite communications. For example, in at least some example embodiments, a satellite may operate within the frequency of the C-band defined by the ITU. The C-band is a portion of the electromagnetic spectrum that ranges from approximately 4 GHz to 8 GHz. That is, the communication signals are transmitted by and received at the satellite within such a frequency range.

In some cases, the satellite may operate within frequencies higher than 8 GHz. For example, the satellite may operate within the frequency of the Ku-band. The Ku-band is the portion of the electromagnetic spectrum that ranges from approximately 10 GHz to 18 GHz.

In at least some example embodiments, the satellite may operate within other high frequencies above the Ku-band. For example, the satellite may operate within the Ka-band frequency. The Ka-band is the portion of the electromagnetic spectrum that ranges from approximately 26.5 GHz to 40 GHz (at present, the assigned slots for fixed satellite service (FSS) are 27-31 GHz for uplink and 17.7-21.2 GHz for downlink).

In some examples, the satellite may be configured to operate in more than one band. In one example, the satellite may be equipped to receive and transmit signals within the C-band, Ku-band, and Ka-band.

It will be appreciated that the satellites may operate within other microwave frequency bands. For example, the satellites may operate in any one of the defined microwave frequency bands ranging in frequencies from approximately 1 GHz to 170 GHz. Examples of other microwave frequency bands may include the X-band, Q-band, V-band, etc.

Dual-Band Communication Satellite Systems

Reference is now made to FIG. 1, which is a block diagram of a conventional dual-band communication satellite system 100. The dual-band communication satellite system 100 may be configured for Ku-band and Ka-band frequencies. A Ku-band system 150 may be separate from a Ka-band system 110. Each of the Ku-band system 150 and the Ka-band system 110 may include an antenna system. For example, the Ku-band system 150 may have a Ku-band antenna system 154 and the Ka-band system 110 may have a Ka-band antenna system 114. The respective antenna systems may include feed networks and antennas for propagating RF signals for the respective frequency bands.

The Ku-band system 150 may include a Ku-band reflector 156. The Ka-band system 110 may include a Ka-band reflector 116. Thus, each of the Ku-band system 150 and the Ka-band system 110 may have its own reflector. The individual reflectors may be optimized for respective frequency bands. In some embodiments, the reflectors may have a diameter of 2 to 3 meters. In other embodiments, the reflectors may be any size. The Ku-band sub-system 150 may include a Ku-payload 152. The Ka-band subsystem 110 may include a Ka-payload 112.

Figure 2:
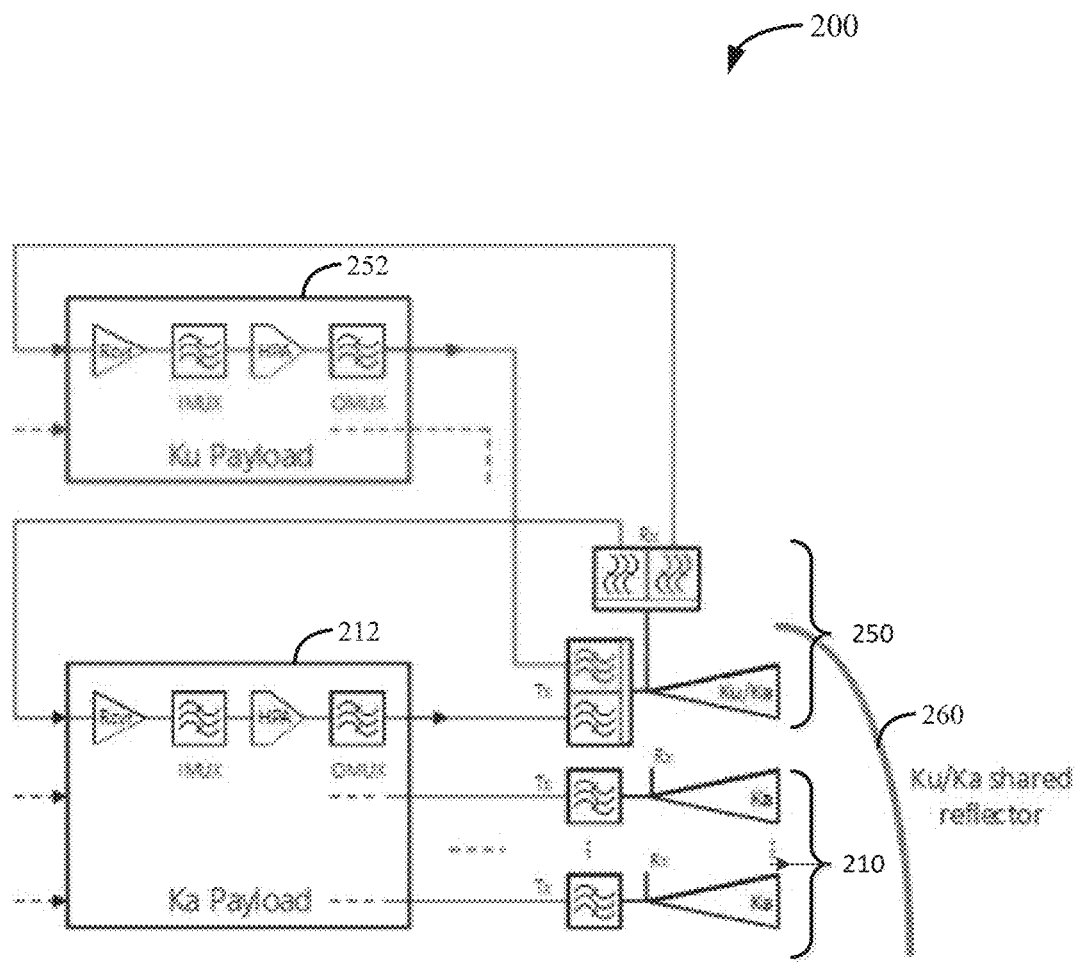
FIG. 2 is a block diagram of a dual-band communication satellite system in accordance with an embodiment of the present application.

Reference is now made to FIG. 2, which is a block diagram of a dual-band communication satellite system 200 in accordance with an embodiment the present application. The dual-band communication satellite system 200 includes a Ka-band payload 212 and a Ku-band payload 252. Although the illustrated dual-band communication satellite system 200 may provide spot beams for the Ka/Ku band of frequencies, it will be appreciated that aspects of the present application may be implemented for any other frequency band pairs, such as C-band/Ku-band and Ka-band/Q-band of frequencies.

The dual-band communication satellite system 200 includes an array of feeds for providing spot beams for a satellite coverage perimeter. For example, the array of feeds may include a plurality of single band feeds 210 and multi-band feeds 250. The single band feeds 210 may provide first frequency band spot beams. For example, the single band feeds 210 may provide Ka-band spot beams. Although two single band feeds 210 are illustrated, the dual-band communication satellite system 200 may include any number of single band feeds 210.

In some embodiments, each multi-band feeds 250 may generate a first frequency band spot beam and a second frequency band spot beam. In the description that follows, the first frequency band spot beam and the second frequency band spot beam generated by a multi-band feed 250 may collectively be described as a dual-band spot beam. In some embodiments, the second frequency band spot beam may be concentric with the first frequency band spot beam. That is, the first frequency band spot beam may share a boresight with the second frequency band spot beam. In some embodiments, the first frequency band spot beam may be a Ka-band spot beam and the second frequency band spot beam may be a Ku-band spot beam.

In some embodiments, the first frequency band spot beam may have a different beamwidth than the second frequency band spot beam. For example, the Ka-band beamwidth may be smaller than the Ku-band beamwidth. In some embodiments, the multi-band feeds 250 may include Ka-band and Ku-band waveguides and may combine RF signals from Ka-band and Ku-band frequencies using associated filters and combining devices. Although one multi-band feed 250 is illustrated in FIG. 2, in some embodiments the dual-band communication satellite system 200 may include any number of multi-band feeds 250.

In some embodiments, the multi-band feeds 250 may generate multi-band spot beams. For example, each multi-band spot beam may include a first frequency band spot beam, a second frequency band spot beam, and a third frequency band spot beam. The first frequency band spot beam, the second frequency band spot beam, and the third frequency band spot beam may share a common boresight. That is, each of the spot beams in the multi-band spot beam may be concentric with other spot beams in the multi-band spot beam. As an illustrating example, the first frequency band spot beam may be an X-band spot beam, the second frequency band spot beam may be a Ku-band spot beam, and the third frequency band spot beam may be a Ka-band spot beam. Although the X-band, Ku-band, and Ka-band are referenced, the spot beams can be of any other frequency band. In some other embodiments, the multi-band spot beam may include a fourth frequency band spot beam or any number of additional band spot beams.

In some embodiments, the number of multi-band feeds 250 may be different than the number of single-band feeds 210. For example, the number of multi-band feeds 250 for providing dual-band spot beams may be less than the number of single band feeds 210 for providing single-band spot beams.

The dual-band communication satellite system 200 may also include a shared reflector 260. For example, the shared reflector 260 may be a Ka-band/Ku-band shared reflector. Rather than providing a first reflector for single band feeds and a second reflector for multi-band feeds, each of the plurality of single band feeds 210 and the one or more multi-band feeds 250 may transmit and receive signals using the shared reflector 260. That is, the shared reflector 260 may propagate and receive RF signals for both Ka-band frequencies and Ku-band frequencies. It will be appreciated that the shared reflector 260 may be for any other frequency bands.

In some embodiments, the shared reflector 260 is for at least one single band feed 210 and for at least one multi-band feed 250. In some other embodiments, the shared reflector 260 is for each of the plurality of single band feeds 210 and for each of the multi-band feeds 250 in the array of feeds.

In some embodiments, the dual-band communication satellite system 200 may include two or more shared reflectors 260 for propagating and receiving RF signals for single band feeds 210 and multi-band feeds 250. In some embodiments, a shared reflector 260 may be capable of propagating and receiving RF signals for a set maximum number of feeds. As an illustrating example, a shared reflector 260 may be capable of supporting six single-band feeds and three multi-band feeds. Accordingly, if the array of feeds were to include twelve single band feeds 210 and six multi-band feeds 250, the dual-band communication satellite system 200 may include two shared reflectors 260. Although the example described above implements two shared reflectors 260 for twelve single band feeds 210 and six multi-band feeds 250, the system could include any number of single band feeds 210 and any number of multi-band feeds 250, and could further include any number of shared reflectors 210 for propagating and receiving RF signals for the single band feeds 210 and multi-band feeds 250.

In some embodiments, the dual-band communication satellite system 200 may include two or more shared reflectors 260 and each shared reflector 260 may be the same size as another shared reflector 260. In some embodiments, a first shared reflector may be for propagating and receiving RF signals for the plurality of single band feeds 210 and a second shared reflector may be for propagating and receiving RF signals for one or more multi-band feeds 250. Accordingly, embodiments of the present application may include two or more shared reflectors 260 having the same reflector size for propagating and receiving RF signals for any number of single band feeds 210 and multi-band feeds 250.

A first frequency band spot beam may have a first beamwidth. A second frequency band spot beam may have a second beamwidth. In some embodiments, the shared reflector 260 may have a reflector size. The reflector size may be based on at least one of a first beamwidth and a first frequency band spot beam EOC peak-to-edge gain delta requirement. In some embodiments, the reflector size may be based on at least one of a second beamwidth and a second frequency band spot beam EOC peak-to-edge gain delta requirement. In some other embodiments, the reflector size may be based on consideration of both the first beamwidth and the second beamwidth. That is, instead of prioritizing the reflector size based on a single beamwidth, the reflector size may be based on balancing the requirements of both the first frequency band spot beam (or first beamwidth) and the second frequency band spot beam (or second beamwidth) for achieving a desired spot beam layout for providing dual-band satellite coverage.

Figure 3:
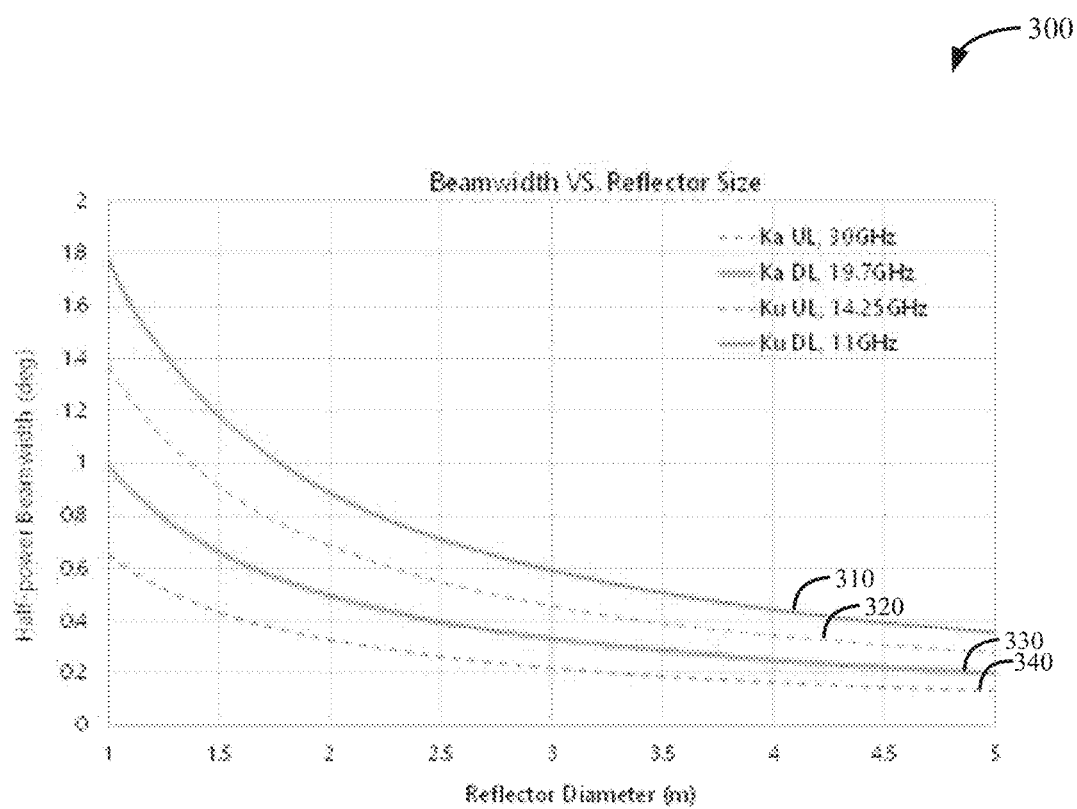
FIG. 3 is a chart illustrating a relationship of satellite spot beam beamwidth versus reflector size for example Ka-band and Ku-band frequencies.

Reference is now made to FIG. 3, which is a chart 300 illustrating a relationship of satellite spot beam half-power beamwidth versus reflector size for example Ka-band and Ku-band frequencies. A plot of the half-power beamwidth (in degrees) versus reflector diameter (in meters) for Ku-band downlink at 11 GHz may be illustrated by a first curve 310. A plot of the half-power beamwidth (in degrees) versus reflector diameter (in meters) for Ku-band uplink at 14.25 GHz may be illustrated by a second curve 320. A plot of the half-power beamwidth (in degrees) versus reflector diameter (in meters) for Ka-band downlink at 19.7 GHz may be illustrated by a third curve 330. A plot of the half-power beamwidth (in degrees) versus reflector diameter (in meters) for Ka-band uplink at 30 GHz may be illustrated by a fourth curve 340.

In some embodiments, the shared reflector 260 (FIG. 2) may have a fixed size and the spot beam half-power beamwidth may be inversely proportional to an operating frequency. For example, as a Ka Tx-band frequency (e.g., 17.7 to 22.0 GHz) may be approximately double a Ku Tx-band frequency (e.g., 10.7 to 12.75 GHz), the natural beamwidth of Ku-band spot beams may be approximately double the natural beamwidth of Ka-band spot beams. Accordingly, in some embodiments, the array of feeds may include a plurality of single band feeds 210 (FIG. 2) and one or more multi-band feeds 250 (FIG. 2), where the number of multi-band feeds 250 may be less than the number of single-band feeds 210. Even though the number of multi-band feeds 250 may be less than the number of single-band feeds 210, because the shared reflector 260 may have a fixed size, dual-band satellite coverage may be provided. Although the above example illustrates the beamwidth of Ku-band spot beams being approximately double the natural beamwidth of Ka-band spot beams, the Ku-band beamwidth may, in some embodiments, be four times Ka-band beamwidth, or any other multiple of beamwidth of the Ka-band spot beams.

Spot Beam Layouts

Figure 4:
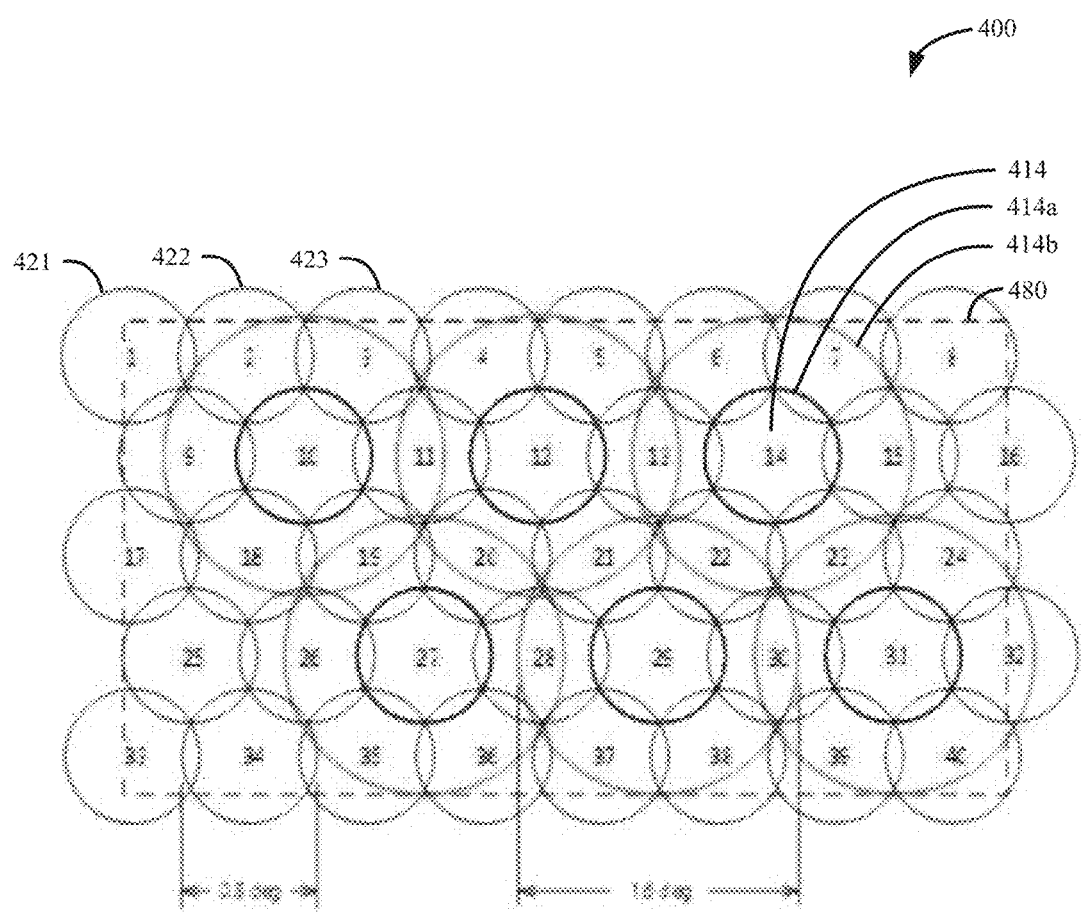
FIG. 4 is an example spot beam layout for a satellite coverage perimeter.

Reference is now made to FIG. 4, which a spot beam layout 400 for a satellite coverage perimeter 480, in accordance with an embodiment of the present application. The spot beam layout 400 may include Ka-band spot beams and Ku-band spot beams. The spot beam layout 400 may be provided by the dual-band communication satellite system 200 of FIG. 2. The desired satellite coverage perimeter 480 is illustrated with dashed lines and may be a rectangular perimeter. Although the satellite coverage perimeter 480 is illustrated as a rectangular perimeter, the desired satellite coverage perimeter 480 may be any other shape or combination of shapes.

The spot beam layout 400 of FIG. 4 may include first frequency band spot beams and second frequency band spot beams. For example, first frequency band spot beams may be Ka-band spot beams and second frequency band spot beams may be Ku-band spot beams. The spot beam layout 400 of FIG. 4 may be generated by a plurality of single band feeds 210 (FIG. 2) and one or more multi-band feeds 250 (FIG. 2).

In some embodiments, the multi-band feeds 250 may each generate a first frequency band spot beam (e.g., Ka-band spot beam) and a second frequency band spot beam (e.g., Ku-band spot beam). A first frequency band spot beam and a second frequency band spot beam generated by a multi-band feed 250 may collectively be described as a dual-band spot beam. In the example illustrated in FIG. 4, the first frequency band spot beam may have a smaller beamwidth than the second frequency band spot beam. That is, the first frequency band spot beams are illustrated with smaller diameter circles than the second frequency band spot beams.

For the spot beam layout 400 of FIG. 4, six multi-band feeds 250 may generate six dual-band spot beams. That is, each multi-band feed 250 may generate a dual-band spot beam. For example, a multi-band feed 250 may generate a dual-band spot beam 414 indicated at a location identified by the number 14. The dual-band spot beam 414 may include a first frequency band spot beam 414a (small circle) and a second frequency band spot beam 414b (large circle). Accordingly, a dual-band satellite communication system 200 (FIG. 2) may include six multi-band feeds 250, and each of the six multi-band feeds 250 may generate a dual-band spot beam. Six dual-band spot beams are illustrated in FIG. 4 and are indicated at locations identified by the numbers 10, 12, 14, 27, 29, and 31. The locations of the six dual-band spot beams are graphically illustrated with small circles being thicker circles.

In addition to the six illustrated dual-band spot beams in FIG. 4, the spot beam layout 400 of FIG. 4 may also include a plurality of additional first frequency band spot beams (e.g., Ka-band spot beams). That is, in addition to the first frequency band spot beams indicated at locations identified by numbers 10, 12, 14, 27, 29, and 31 (discussed above), a plurality of single band feeds 210 may generate the plurality of additional first frequency band spot beams at locations indicated by numbers 1 to 9, 11, 13, 15 to 26, 28, 30, and 32 to 40. Accordingly, 34 single band feeds 210 may generate the additional 34 first frequency band spot beams at locations indicated by numbers 1 to 9, 11, 13, 15 to 26, 28, 30, and 32 to 40. For ease of illustration, three first frequency band spot beams generated by single band feeds 210 have been identified, such as first spot beam 421, second spot beam 422, and third spot beam 423. As will be apparent from the present application, rather than requiring 40 multi-band feeds 250 for generating the spot beam layout 400 of FIG. 4, 6 multi-band feeds 250 and 34 single band feeds 210 may generate the spot beam layout 400 of FIG. 4.

Each illustrated spot beam may indicate an edge-of-coverage (EOC) contour of a first frequency band spot beam (e.g., first spot beam 421 indicates the EOC contour of a Ka-band spot beam). In some embodiments, the EOC contour may be based on a 3 dB (half-power) to 7 dB beam peak-to-edge gain delta. For example, a Ka-band beamwidth, at its 3 dB EOC downlink gain delta level, may be 1.6 degrees. Thus, in the present example, a Ku-band beamwidth may be two times the Ka-band beamwidth.

Based on the foregoing discussion, each of the 6 multi-band feeds 250 and the 34 single band feeds 210 may receive and transmit RF signals using the shared reflector 260 (FIG. 2). As described above, in some embodiments, a shared reflector 260 may be capable of propagating and receiving RF signals for a maximum number of feeds, where the feeds in the maximum number of feeds could include any of either the single band feeds 210 (FIG. 2) or the multi-band feeds 250 (FIG. 2). Accordingly, two or more shared reflectors 260 may be needed if the number of feeds in the array of feeds exceeds the maximum number of feeds that may be supported by one shared reflector 260.

Some embodiments of the dual-band communication satellite system 200 in the present application may utilize a fewer total number of reflectors as compared to a conventional dual-band communication satellite system 100 (FIG. 1). In the conventional dual-band communication satellite system 100, a specifically sized Ka-band reflector 116 (FIG. 1) may be required for first frequency band feeds (e.g., Ka-band feeds). Further, a second specifically sized Ku-band reflector 156 (FIG. 1) may be required for second frequency band feeds (e.g., Ku-band feeds). In contrast, a dual-band communication satellite system 200 of the present application may include a shared reflector 260 capable of both propagating and reflecting RF signals for both single-band feeds 210 (e.g., Ka-band feeds) and multi-band feeds 250 (e.g., for generating Ka-band and Ku-band signals). Accordingly, because the shared reflector 260 may be capable of servicing either of first frequency band signals and second frequency band signals, the total number of required reflectors for servicing the array of single band feeds 210 and multi-band feeds 250 may be less than the total number of required reflectors in the conventional dual-band communication satellite system 100 (e.g., total number of required reflectors including number of Ka-band reflectors 116 and Ku-band reflectors 156). That is, the dual-band communication satellite system 200 of the present application may be optimized to utilize a minimum number of reflectors.

Figure 5:
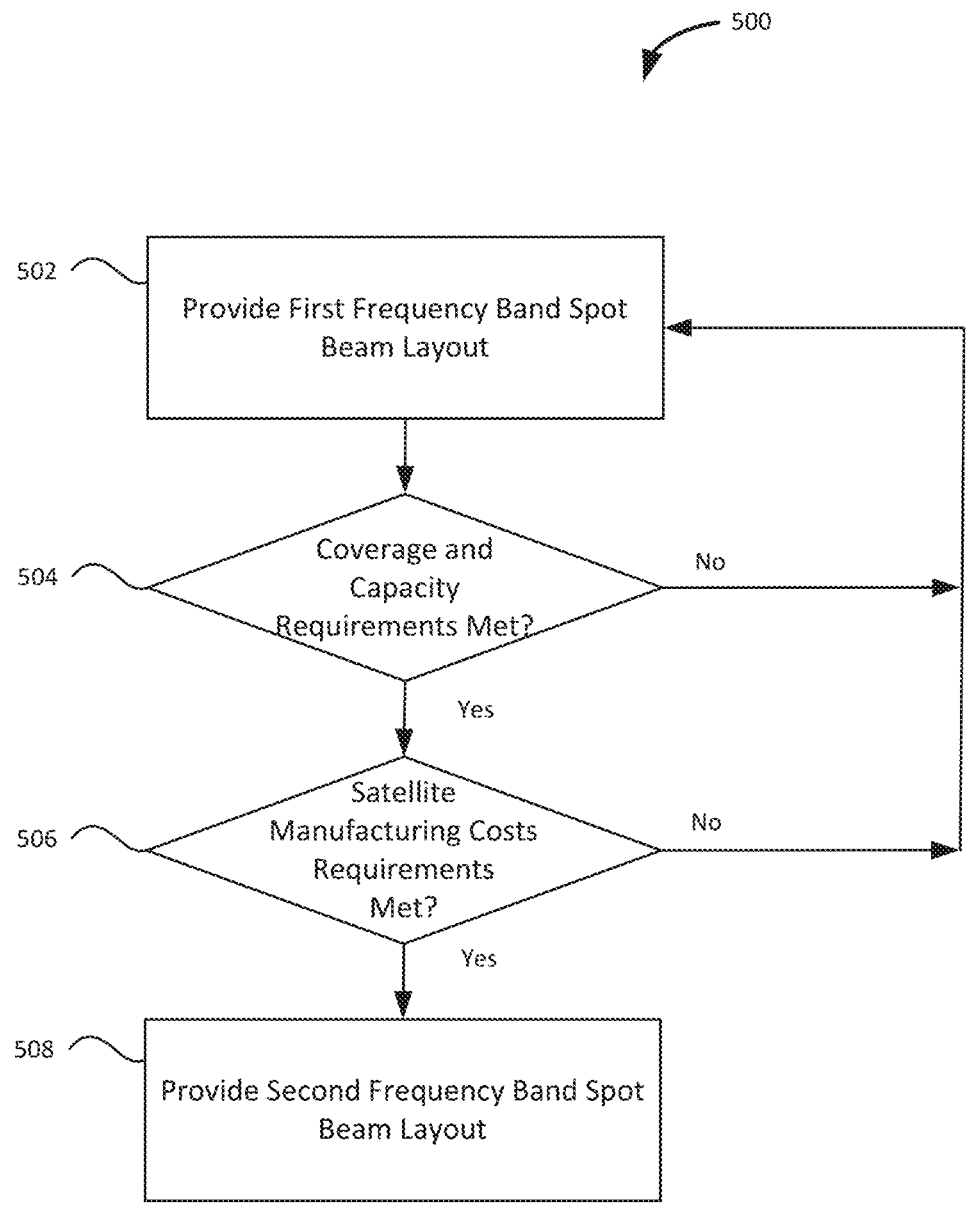
FIG. 5 is a flowchart illustrating a method for providing a dual-band spot beam layout plan.

Reference is now made to FIG. 5, which is a flowchart illustrating a method 500 for providing a dual-band spot beam layout plan in accordance with an embodiment of the present application. For ease of description, the method 500 may be described with reference to the dual-band communication satellite system 200 of FIG. 2. In some embodiments, the array of feeds, including the plurality of single-band feeds 210 (FIG. 2) and one or more multi-band feeds 250 (FIG. 2), may be selectively configured for providing the spot beam layout 400 for the desired satellite coverage perimeter 480 FIG. 4).

At 502, a first frequency band spot beam layout may be provided. For example, the first frequency band spot beams may be Ka-band spot beams. Single band feeds 210 may provide the Ka-band spot beams. As will be described with reference to FIG. 6, the first frequency band spot beam layout for a desired coverage perimeter 480 may be dependent on a Ka-band spot beam EOC diameter (e.g., beamwidth) and based on other design requirements for the Ka-band spot beam.

For example, the first frequency band spot beam layout may initially include the plurality of first frequency band spot beams numbered from 1 to 40 (illustrated in FIG. 4). The first frequency band spot beam layout may include contiguous first frequency band spot beams and may provide satellite coverage for the first frequency band for the area within the desired coverage perimeter 480. In some embodiments, the method at 502 may be a preliminary step, as single band feeds 210 may be configured to provide the plurality of first frequency band spot beams. However, as will be apparent at the method at 508, one or more of the single band feeds 210 may be exchanged for a multi-band feed 250 for providing both a first frequency spot beam and a second frequency spot beam (e.g., dual-band spot beam).

Once an initial first frequency band spot beam layout is provided, at 504, satellite coverage and capacity requirements may be evaluated. For example, if an initial first frequency band spot beam layout does not provide for 100% first frequency band satellite coverage for the coverage perimeter, the first frequency band spot beam layout design process at 502 may be iterated. In another example, the data throughput or capacity requirement for the spot beams may be evaluated. If the data throughput or capacity requirements are not met, the first frequency band spot beam layout design process at 502 may be iterated.

If the satellite coverage and capacity requirements are met, at 506, satellite system manufacturing costs may be evaluated. For example, a first satellite system with greater number of feeds may be more expensive than a second satellite system with lesser number of feeds. Accordingly, if a satellite system does not meet cost requirements, the first frequency band spot beam layout design process may be iterated. That is, an iterated first frequency band spot beam layout may be provided by a satellite system utilizing fewer number of feeds, but may require that each first frequency spot beam have increased EOC coverage. In some embodiments, other manufacturing or material related costs for the dual-band satellite communication system 200 may be evaluated.

Although multiple frequency bands are implemented with multi-band feeds 250 (FIG. 2), in some embodiments, it may not be necessary to optimize signal transmission and reception performance for all frequency bands involved. For example, if multi-band feeds 250 provide a dual-band spot beam including a Ka-band spot beam and a Ku-band spot beam, in some embodiments, it may not be necessary to optimize the signal transmission and reception performance for both the Ka-band spot beam and the Ku-band spot beam. To minimize costs, a multi-band feed 250 may be configured to generate Ka-band spot beams for optimal Ka-band signal transmission and reception performance, while the multi-band feed 250 may not necessarily be configured to generate Ku-band spot beams for optimal Ku-band signal transmission and reception performance. That is, the Ku-band signal transmission and reception performance may be acceptable, but may not be fine optimized.

If the satellite system manufacturing costs are met, at 508, a second frequency band spot beam layout may be provided. For example, one or more feeds in the array may be selected or allocated as a multi-band feed 250 for generating a dual-band spot beam (see e.g., dual-band spot beam 414 in FIG. 4). For example, the method at 502 configured single band feeds 210 to provide a plurality of first frequency band spot beams. However, because dual-band satellite coverage may be desired, a subset of the single band feeds 210 may be exchanged for a multi-band feed 250 for providing both a first frequency spot beam and a second frequency spot beam (e.g., dual-band spot beam). At 508, the array of feeds may now include a plurality of single band feeds 210 and one or more multi-band feeds 250. At 508, the number of multi-band feeds 250 for generating first frequency spot beams may be less than the number of single band feeds 210 that were configured at the method at 502. Overall, the preliminary configuration of the array to include single band feeds 210 at 502 may be modified at 508.

Referring again to FIG. 4, multi-band feeds 250 may generate dual-band spot beams at layout location numbers 10, 12, 14, 27, 29, and 31. Using the third dual-band spot beam 414 identified by location 14 in FIG. 4 as an example, dual-band spot beams may include a first frequency band spot beam 414a (e.g., Ka-band spot beam) and a second frequency band spot beam 414b (e.g., Ku-band spot beam). The Ku-band spot beam may be concentric with the Ka-band spot beam. That is, the Ka-band spot beam and the Ku-band spot beam may be circular and may share a common boresight. Although the spot beams are described as being circular, in some embodiments, the spot beams may be non-circular; however, the first frequency band spot beam 414a and the second frequency band spot beam 414b may share a common boresight. Because the Ku-band spot beam 414b may have a beamwidth that is larger than the Ka-band spot beam 414a, fewer multi-band feeds 250 for providing dual-band spot beams may be required for providing dual-band satellite coverage for a desired coverage perimeter 480. In some embodiments, when providing a second frequency band spot beam layout, dual-band spot beam location(s) may be selected based on desired dual-band satellite coverage requirements. For example, the dual-band spot beam location(s) may be selected based on identification of highly populated regions within the satellite coverage perimeter.

Based on the foregoing discussion, it will be apparent that the method 500 at 502 includes a preliminary allocation of single band feeds 210 (FIG. 2) for generating first frequency band spot beams. Thereafter, the method 500 at 508 includes iterating the array allocation of feeds such that one or more single band feeds 210 configured at 502 may be substituted for multi-band feeds 250 at 508. The substituted multi-band feeds 250 may still provide the first frequency band spot beam, but may additionally provide a second frequency band spot beam being concentric with the first frequency band spot beam.

Figure 6:
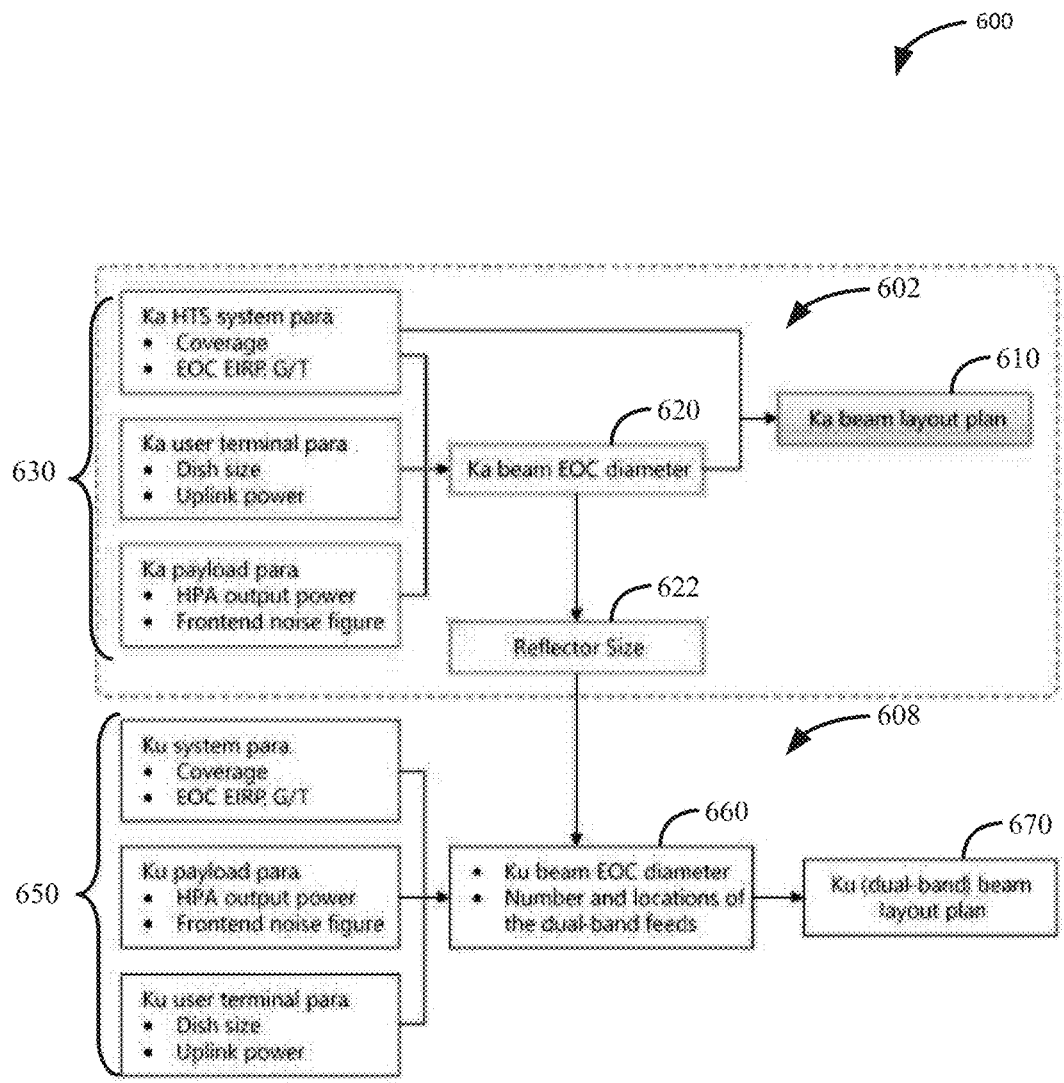
FIG. 6 is a chart illustrating example details relating to the method of FIG. 5 in accordance with an embodiment of the present application.

Reference is now made to FIG. 6, which is a chart 600 illustrating additional details relating to the method of FIG. 5 in accordance with an embodiment of the present application. A first portion 602 may relate to a first frequency band spot beam layout 610 and may relate to the first frequency band spot beam layout process at 502 (FIG. 5). A second portion 608 may relate to a dual-band spot beam layout 670 and may relate to the second frequency band spot beam layout process at 508 (FIG. 5).

In some embodiments, the first frequency band spot beam layout 610 may be based on a first frequency band beamwidth. For example, the first frequency band spot beam layout 610 may be based on a Ka-band spot beam EOC diameter 620. Ka-band spot beams with a determined Ka-band spot beam EOC diameter 620 may be selectively positioned within the first frequency band spot beam layout 610 to provide desired Ka-band frequency coverage. For example, a large first frequency band beamwidth may provide first frequency band coverage using fewer first frequency band spot beams, whereas a small first frequency beamwidth may require more spot beams to provide first frequency band coverage for the same given satellite coverage area.

In other embodiments, the first frequency band spot beam layout 610 may be based on Ka-band system parameters 630, such as coverage requirements and/or EOC, EIRP, and G/T requirements. For example, the first frequency band spot beam layout 610 may be based on a first frequency band spot beam EOC peak-to-edge gain delta requirement. If a first frequency spot beam EOC peak-to-edge gain delta requirement may be relaxed (e.g., relaxed to range of 8 dB to 10 dB), the first frequency band beamwidth may be enlarged and the number of single band frequency feeds needed for providing first frequency band coverage may decrease. Referring again to FIG. 4, the spot beam layout 400 may contain an array of spot beams having eight (8) Ka-band spot beams across and five (5) Ka-band spot beams deep. If the Ka-band spot beam EOC peak-to-edge gain delta requirement were relaxed, the Ka-band beamwidth may increase and the number of Ka-band spot beams for providing Ka-band satellite coverage (e.g., spot beam layout 400 of FIG. 4) for the same given satellite coverage area may decrease.

In some embodiments, the Ka-band beam EOC diameter 620 may be based on Ka-band payload 212 (FIG. 2) parameters or requirements, such as high power amplifier (HPA) output power requirements and/or front end noise figure requirements. In some embodiments, the Ka-band beam EOC diameter may be based on Ka-band user terminal parameters, such as dish or reflector size parameters and uplink power parameters. The present description provides a brief listing of Ka-band system and/or payload parameters; however, other Ka-band related parameters may be taken into account.

Once a Ka-band spot beam EOC diameter (e.g., beamwidth) is determined for the first frequency spot beam layout 610, a reflector size 622 may be determined. That is, based on a required operating frequency (or frequency range) and the determined first frequency spot beam EOC diameter, a reflector size 622 may be determined. In some embodiments, the reflector size 622 may be determined based at least in part on the half-power beamwidth versus reflector diameter relationship illustrated in FIG. 3.

The second portion 608 may relate to a dual-band spot beam layout 670 and may relate to the second frequency band spot beam layout design process at 508 of FIG. 5. In some embodiments, the dual-band spot beam layout 670 may be based on a Ku-band spot beam EOC diameter and a determination of the number and sequence order of multi-band feeds 250 (FIG. 2) in an array of feeds (collectively identified in FIG. 6 as 660). The shared reflector 260 (FIG. 2) may be used for propagating and receiving RF signals for both single band feeds 210 (FIG. 2) and multi-band feeds 250. Based on the previously determined reflector size 622 and the operating frequency (or frequency range) of the Ku-band RF signals, a Ku-band spot beam EOC diameter may be determined based in part on the half-power beamwidth versus reflector diameter relationship illustrated in FIG. 3.

In some embodiments, the dual-band spot beam layout 670 may be iteratively determined based on (1) the number of available multi-band feeds 250; (2) identification of high throughput demand areas; and (3) the required second frequency band service coverage area. For example, referring again to FIG. 4, the configuration of the array of multi-band feeds 250 generating dual-band spot beams (e.g., identified numerically at 10, 12, 14, 27, 29, and 31 of FIG. 4) may be chosen based on identified high throughput demand areas within the satellite coverage perimeter 480 (FIG. 4). In some embodiments, where the number of multi-band feeds 250 may be limited, allocated multi-band feeds 250 for providing dual-band spot beams may be "ear-marked" for the "highest" throughput demand areas. For example, if 8 portions within the satellite coverage perimeter 480 desire dual-band coverage, but only 6 multi-band feeds 250 may be available for generating 6 dual-band spot beams, the 6 portions within the satellite coverage perimeter 480 may be "ear-marked" as portions within the satellite coverage perimeter 480 on which a multi-band feed 250 may generate a dual-band spot beam for.

Referring still to FIG. 4, as an illustrating example, Ka-band spot beams (e.g., small circles) may be configured for high throughput demand or data-intensive areas, whereas Ku-band spot beams (e.g., large circles) may be for extending data service coverage to areas where Ku-band frequencies may be required (e.g., for servicing less data-intensive areas, for mitigating signal fade due to heavy rain conditions, for servicing Ku-only user terminals, etc.). Further, Ku-band spot beams may provide supplemental data coverage capacity.

In some embodiments, the Ku-band spot beam EOC diameter and the number/locations of multi-band (or dual-band) feeds (e.g., identified as 660) may be based on Ku-band system parameters 650. For example, the Ku-band system parameters 650 may include parameters such as coverage requirements and/or EOC, EIRP, and G/T requirements. Further, the Ku-band system parameters 650 may include Ku-band payload requirements such as high power amplifier (HPA) output power requirements and/or front end noise figure requirements. In some embodiments, the Ku-band system parameters 650 may also include Ku-band user terminal parameters, such as uplink power parameters and satellite dish size requirements. The present description provides a brief listing of Ku-band system and/or payload parameters; however, other Ku-band related parameters may be taken into account.

Based on the foregoing examples, it will be apparent that one or more multi-band feeds 250 may generate dual-band spot beams for a dual-band spot beam layout 670 and a plurality of single band feeds 210 may generate first frequency band spot beams for a first frequency band layout 610. It will be understood that, in some embodiments, an initial or first frequency band layout 610 may be generated by a plurality of single band feeds 210. However, the number of single band feeds 210 generating the first frequency band layout 610 may be adjusted when a dual-band spot beam layout 670 may be generated by one or more multi-band feeds 250. That is, the multi-band feeds 250 may provide first frequency band spot beams in addition to second frequency band spot beams. Duplicate first frequency band spot beams generated by single band feeds 210 may be removed when multi-band feeds 250 may be configured to replace single band feeds 210 in an array of feeds. For example, when a first frequency band layout 610 is initially provided, single band feeds 210 may be allocated for generating first frequency band spot beams at locations identified with numbers 10, 12, 14, 27, 29, and 31 (FIG. 4). However, when the dual-band spot beam layout 670 is provided, the single band feeds 210 generating first frequency band spot beams at locations identified with numbers 10, 12, 14, 27, 29, and 31, may be replaced with multi-band feeds 250 for generating the first frequency band spot beams (in addition to second frequency band spot beams) at the aforementioned spot beam locations.

Figure 7:
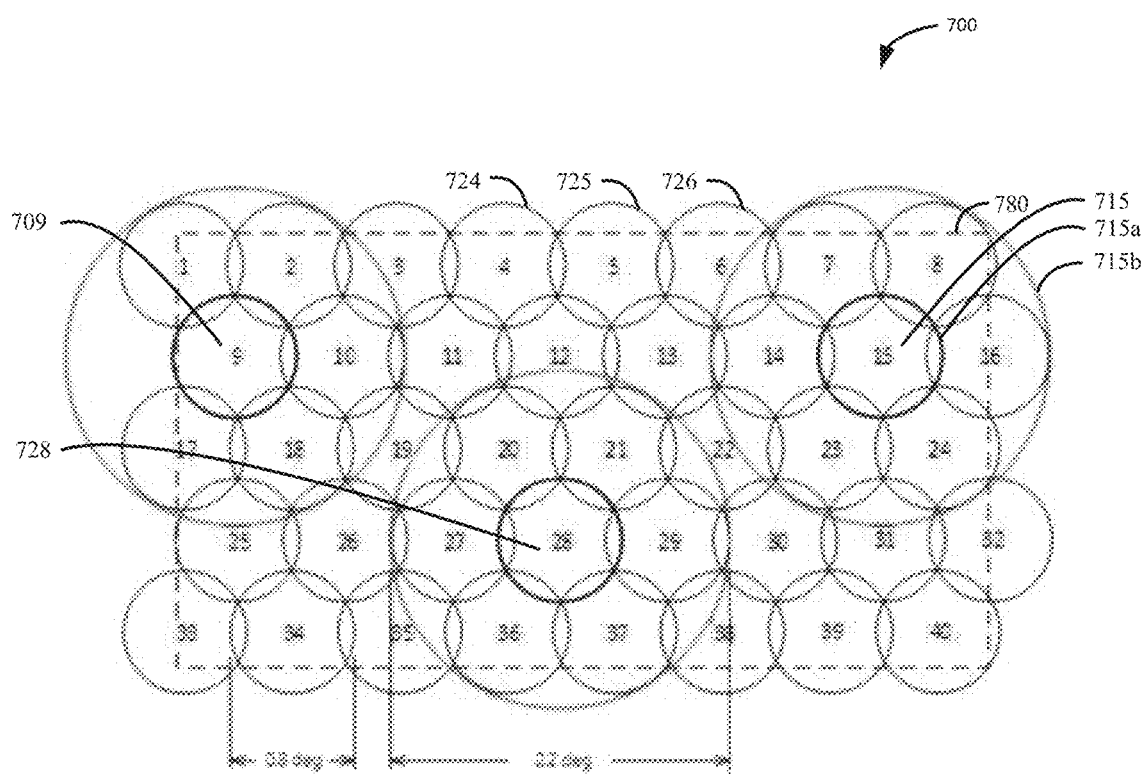
FIG. 7 is another example spot beam layout for a satellite coverage perimeter.

Reference is now made to FIG. 7, which is another example spot beam layout 700 for a satellite coverage perimeter 780, in accordance with an embodiment of the present application. The spot beam layout 700 may include spot beams for Ka-band and Ku-band frequencies. The spot beam layout 700 may be provided by the dual-band communication satellite system 200. The desired satellite coverage perimeter 780 is illustrated by dashed lines and may be a rectangular perimeter. Although the satellite coverage perimeter 780 is illustrated as a rectangular perimeter, the desired satellite coverage perimeter 780 may be any other shape or combination of shapes.

The spot beam layout 700 may include first frequency band spot beams and second frequency band spot beams. For example, first frequency band spot beams may be Ka-band spot beams and second frequency band spot beams may be Ku-band spot beams. The spot beam layout 700 of FIG. 7 may be generated by a plurality of single band feeds 210 (FIG. 2) and one or more multi-band feeds 250 (FIG. 2).

In some embodiments, the multi-band feeds 250 may each generate a first frequency band spot beam (e.g., Ka-band spot beam) and a second frequency band spot beam (e.g., Ku-band spot beam). In the example illustrated in FIG. 7, the first frequency band spot beam may have a smaller beamwidth than the second frequency band spot beam. That is, the first frequency band spot beams are illustrated with smaller diameter circles than the second frequency band spot beams.

For the spot beam layout 700 of FIG. 7, three multi-band feeds 250 may generate three dual-band spot beams. That is, each multi-band feed 250 may generate a dual-band spot beam. For example, a multi-band feed 250 may generate a dual-band spot beam 715 indicated at a location identified by the number 15. The dual-band spot beam 715 may include a first frequency band spot beam 715a (small circle) and a second frequency band spot beam 715b (large circle). Accordingly, a dual-band satellite communication system 200 (FIG. 2) may include three multi-band feeds 250, and each of the three multi-band feeds 250 may generate a dual-band spot beam. Three dual-band spot beams are illustrated in FIG. 7 and are indicated at locations identified by the numbers 9, 15, and 28. For example, a first dual-band spot beam 709, a second dual-band spot beam 715, and a third dual-band spot beam 728 are illustrated. The locations of the three dual-band spot beams are graphically illustrated with small circles being thicker circles.

In addition to the three illustrated dual-band spot beams in FIG. 7, the spot beam layout 700 of FIG. 7 may also include a plurality of additional first frequency band spot beams (e.g., Ka-band spot beams). In addition to the first frequency band spot beams indicated at locations identified by numbers 9, 15, and 28 (discussed above), a plurality of single band feeds 210 may generate the plurality of additional first frequency band spot beams at locations indicated by numbers 1 to 8, 10 to 14, 16 to 27, and 29 to 40. Accordingly, 37 single band feeds 210 may generate the additional 37 first frequency band spot beams at locations indicated by numbers 1 to 8, 10 to 14, 16 to 27, and 29 to 40. For ease of illustration, three first frequency band spot beams generated by single band feeds 210 have been identified, such as fourth spot beam 724, fifth spot beam 725, and sixth spot beam 726. As will be apparent from the present application, rather than requiring 40 multi-band feeds 250 for generating the spot beam layout 700 of FIG. 7, 3 multi-band feeds 250 and 37 single band feeds 210 may generate the spot beam layout 700 of FIG. 7.

The total area having dual-band satellite coverage in the spot beam layout 400 illustrated in FIG. 4 may be different than the total area having dual-band satellite coverage in the spot beam layout 700 illustrated in FIG. 7. In some embodiments, when location requirements for dual-band satellite coverage change, allocation of multi-band feeds in the array of feeds of a satellite system may correspondingly change. For example, in FIG. 4, six (6) dual-band spot beams may be generated for portions of the satellite coverage area where throughput demand may be high. In contrast, in FIG. 7, three (3) dual-band spot beams may be generated for portions of the satellite coverage area where different throughput demand may be high. The portions of the satellite coverage area where throughput demand is high in the spot beam layout 400 of FIG. 4 may be different than the spot beam layout 700 of FIG. 7.

In some embodiments, when satellite system requirements change, the spot beam EOC diameter (e.g., beamwidth) may also change. For example, when a Ku-band spot beam EOC peak-to-edge gain delta requirement may be relaxed (e.g., relaxed to range of 8 dB to 10 dB), the Ku-band beamwidth may be enlarged, thereby reducing the number of multi-band feeds required to provide dual-band satellite coverage within the satellite coverage perimeter 780. Accordingly, in FIG. 7, the Ku-band spot beam EOC peak-to-edge gain delta requirement may be relaxed and the Ku-band beamwidth may be 2.2 degrees (as compared to the Ku-band beamwidth of 1.6 degrees in the layout 400 in FIG. 4).

Based on the foregoing discussion, the dual-band communication satellite system 200 (FIG. 2) of the present application may be a simplified and cost-efficient system for providing dual-band satellite coverage to a coverage perimeter. As discussed with reference to FIG. 2, the dual-band communication satellite system 200 may include an array of feeds for propagating RF signals. The array of feeds may include: (a) single band feeds 210 for providing first frequency band spot beams; and (b) multi-band feeds 250 for providing first frequency band spot beams and second frequency band spot beams. Further, the dual-band communication satellite system 200 may include a shared reflector 260. Because the shared reflector 260 may be simultaneously used for propagating and receiving RF signals to and from the single band feeds 210 and the multi-band feeds 250, a first frequency band beamwidth may be different than a second frequency band beamwidth. For example, if the first frequency band is the Ka-band and if the second frequency band is the Ku-band, then the second frequency band beamwidth may be approximately double the first frequency band beamwidth (see examples described in relation to FIG. 3). Because the Ku-band beamwidth may be larger than the Ka-band beamwidth, fewer multi-band feeds 250 may be required for providing dual-band coverage to a coverage perimeter. Accordingly, features of the dual-band communication system 200 in accordance with the present application may reduce the overall cost of providing the system and may simplify the antenna network and configuration design. For example, multi-band feeds 250 may cost more than single band feeds 210. Therefore, embodiments of the present application may use fewer multi-band feeds 250 than single band feeds 210 (e.g., for generating the dual-band spot beam layout 400 of FIG. 4, 6 multi-band feeds 250 may be required, rather than 40 multi-band feeds 250).

Further, as the Ku-band beamwidth may be different than the Ka-band beamwidth, embodiments of the present application may not require complex and/or costly feed designs focused on generating the similar spot beam shapes and beamwidths for all frequency bands. That is, embodiments of the present application are not for generating spot beams with similar shapes or spot beams with similar beamwidths; but rather, the embodiments of the present application account for the difference in beamwidths for minimizing the number of multi-band feeds for providing dual-band satellite coverage to a coverage perimeter.

Figure 8:
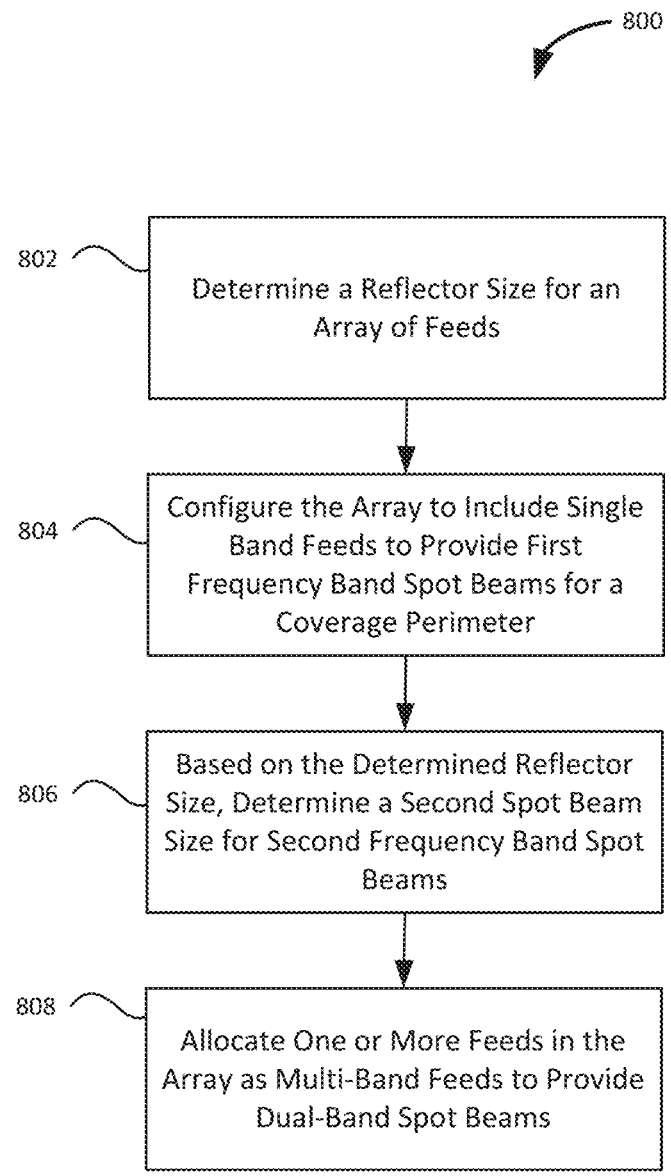
FIG. 8 is a flowchart illustrating an example method for providing dual-band satellite coverage using a spot beam layout for a satellite coverage perimeter.

Reference is now made to FIG. 8, which is a flowchart illustrating an example method 800 of providing satellite coverage by a dual-band satellite system for a coverage perimeter.

The method 800 may include, at 802, determining a reflector size 622 for an array of feeds. The array of feeds may provide first frequency spot beams (e.g., Ka-band spot beams). Each of the first frequency band spot beams may have a first beamwidth. For example, referring again to FIG. 4, the first frequency band spot beams may have a beamwidth of 0.8 degrees. As previously discussed with reference to FIG. 6, the Ka-band beamwidth may be determined based on Ka-band system parameters 630 (FIG. 6). Accordingly, the reflector size 622 may be determined based on the required first beamwidth. In some embodiments, the reflector size 622 may be determined based on the graphical relationship illustrated in FIG. 3.

For example, in some embodiments, determining the reflector size for the array may include determining the first beamwidth based on at least one of an edge-of-coverage requirement of the first frequency band spot beams, an equivalent isotropically radiated power (EIRP) requirement of the first frequency band spot beams, an antenna-to-noise temperature (G/T) requirement of the first frequency band spot beams, or the targeted ground terminal size. Further, determining the reflector size may also include identifying the reflector size based on the first beamwidth (e.g., edge-of-coverage requirement) and a first frequency band spot beam EOC peak-to-edge gain delta requirement.

At 804, the method 800 may include configuring the array of feeds to include single band feeds 210 (FIG. 2) to provide first frequency band spot beams for a coverage perimeter. For example, single band feeds 210 may be configured to provide Ka-band spot beams for the coverage perimeter 480. In FIG. 4, there may be forty (40) Ka-band spot beams numbered from 1 to 40. The forty Ka-band spot beams may be arranged in an array that may be eight (8) first frequency spot beams wide and five (5) second frequency spot beams deep. Ka-band spot beams may provide Ka-band satellite coverage for the area circumscribed by the desired coverage perimeter 480.

At 804, 40 single band feeds 210 may be initially or preliminarily configured to generate first frequency band spot beams. That is, although the method 800 at 804 may provide for configuring the array to include 40 single band feeds 210 to generate 40 Ka-band spot beams, at 808 (to be described below), one or more of the 40 single band feeds 210 may be exchanged or substituted for a multi-band feed 250 (FIG. 2) to provide a first frequency band spot beam, in addition to a second frequency band spot beam.

In some embodiments, an array of feeds may be configured to provide the first frequency band spot beams to maximize the area of satellite coverage perimeter having first frequency band spot beam coverage. In some other embodiments, the array of feeds may be configured to provide first frequency band spot beams to localized high throughput demand areas. Thus, the satellite coverage perimeter may not have 100% first frequency band satellite coverage.

At 806, based on the determined reflector size 622, the method 800 may include determining a second beamwidth for second frequency band spot beams. Because a shared reflector 260 may be used for propagating and reflecting first frequency band spot beams and second frequency band spot beams, based on the relationship that a spot beam half-power beamwidth is inversely proportional to an operating frequency, a second frequency band beamwidth may be greater than a first frequency band beamwidth. For example, as a Ka Tx-band frequency (e.g., 17.7 to 22.0 GHz) may be approximately double a Ku Tx-band frequency (e.g., 10.7 to 12.75 GHz), the natural beamwidth of Ku-band spot beams may be approximately double the natural beamwidth of Ka-band spot beams. As will be apparent from the description in the present application, because the Ku-beamwidth may be twice as large as the Ka-band beamwidth, the number of Ku-band spot beams that may be required to provide Ku-band satellite coverage over an area circumscribed by a coverage perimeter 480 may be less than the number of Ka-band spot beams required to provide Ka-band satellite coverage over an area circumscribed by the coverage perimeter 480.

At 808, the method 800 may include allocating one or more feeds in the array as multi-band feeds to provide dual-band spot beams. Each of the dual-band spot beams may include a first frequency band spot beam (e.g., Ka-band spot beam) and a second frequency band spot beam (e.g., Ku-band spot beam), where the second frequency band spot beam may be concentric with the first frequency band spot beam. As noted in the foregoing discussion, at 808, one or more of the single band feeds 210 previously allocated (at 804) to generate a first frequency band spot beam may be exchanged or substituted for a multi-band feed 250 to provide the first frequency band spot beam. Because the multi-band feed 250 may generate both a first frequency band spot beam and a second frequency band spot beam, the multi-band feed 250 may take the place of select single band feeds 210 for providing the first frequency band spot beams. When multi-band feeds 250 take the place of select single band feeds 210 for providing the first frequency band spot beams, the substitution of single band feeds 210 with multi-band feeds 250 may reduce the number of single band feeds 210 needed for generating first frequency band spot beams in the overall spot beam layout.

As will be apparent from description of the spot beam layout 400 of FIG. 4 and the spot beam layout 700 of FIG. 7, the number of multi-band feeds 250 providing dual-band spot beams may be different than the number of single band feeds 210. For the dual-band satellite communication system 200 of FIG. 2, the number of multi-band feeds 250 providing the dual-band spot beams may be less than the number of single band feeds 210 providing the first frequency spot beams.

Although the foregoing description of embodiments provide for Ka-band and Ku-band spot beams, the dual-band satellite communication system 200 may be configured to provide any dual-band satellite coverage for other frequency band pairs. For example, the dual-band satellite communication system 200 may provide dual-band satellite coverage for C-band and Ku-band RF signals, or may provide dual-band satellite coverage for Ka-band and Q-band RF signals.

In some embodiments, at 802, the method 800 may include determining a reflector size 622 based on requirements for both a first beamwidth and a second beamwidth. That is, instead of prioritizing the reflector size based on one beamwidth, the reflector size may be based on balancing requirements of both the first beamwidth and the second beamwidth for achieving a desired spot beam layout. In some other embodiments, the method 800 may determine a reflector size based on the second beamwidth.

Figure 9:
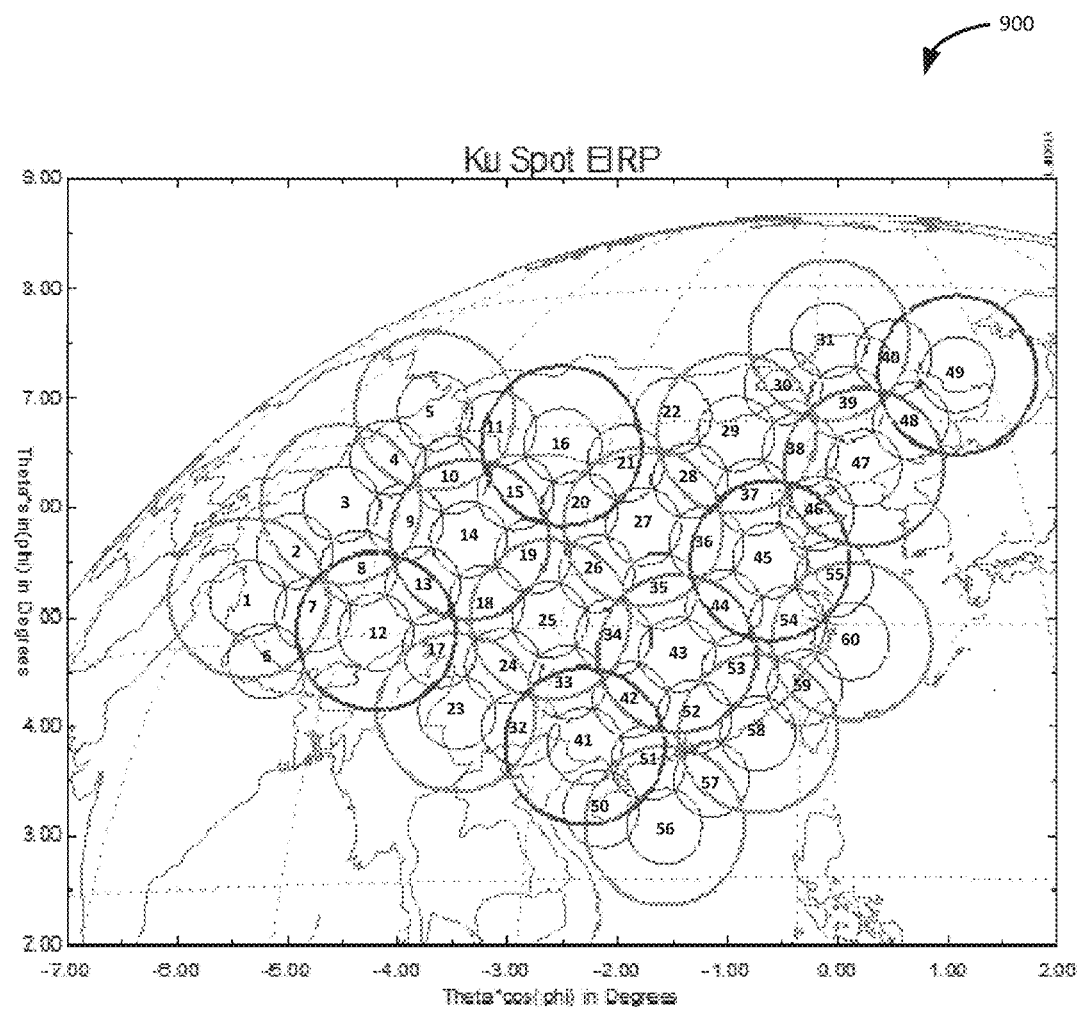
FIG. 9 is an illustration of a spot beam layout overlaid on a map.

Reference is now made to FIG. 9, which is an illustration of a spot beam layout overlaid on a map 900 having a coverage perimeter. For example, the coverage perimeter may be the territorial boundaries of China.

The dual-band spot beam layout 900 illustrated in FIG. 9 may be provided by a dual-band satellite communication system 200 of FIG. 2. For example, Ka-band spot beams may have a beamwidth of 0.69 detrees and Ku-band spot beams may have a beamwidth of 1.12 degrees. In the spot beam layout 900 of FIG. 9, spot beam locations identified with numbers 1, 3, 5, 12, 14, 16, 23, 25, 27, 29, 31, 41, 43, 45, 47, 49, 56, 58, and 60 may be dual-band spot beams and may be generated by multi-band feeds 250 (FIG. 2). Spot beam locations identified by numbers 2, 4, 6 to 12, 13, 15, 17 to 22, 24, 26, 28, 30, 32 to 40, 42, 44, 46, 48, 50 to 55, 57, and 59 may be first frequency band spot beams and may be generated by single band feeds 210 (FIG. 2). Because the dual-band satellite communication system 200 may include a shared reflector 260 for the single band feeds 210 and the multi-band feeds 250, Ku-band spot beams may have a beamwidth that is larger than the beamwidth for Ka-band spot beams. As illustrated in FIG. 9, fewer Ku-band spot beams than Ka-band spot beams may be required to provide dual-band coverage for the territorial boundaries of China.

Although the foregoing description relates to dual-band systems, satellite communication systems may be configured to provide satellite coverage for three or more frequency bands. For example, in some embodiments, based on the determined reflector size (at 802), the method 800 may also include determining a third beamwidth for third frequency band spot beams. The third beamwidth may be different than the first beamwidth and the second beamwidth.

The method 800 may further include allocating one or more feeds in the array to provide multi-band spot beams. Each of the multi-band spot beams may include a first frequency band spot beam, a second frequency band, and a third frequency band spot beam. The first frequency band spot beam, the second frequency band spot beam, and the third frequency band spot beam may share a common boresight. That is, each of the spot beams in the multi-band spot beam may be concentric with other spot beams in the multi-band spot beam. In some other embodiments, the multi-band spot beam may include a fourth frequency band spot beam or any number of additional band spot beams.

For example, in some embodiments, the first frequency band spot beams, the second frequency band spot beams, and the third frequency band spot beams may correspond to a frequency band triple. The frequency band triple may include one of X-band/Ku-band/Ka-band or Ka-band/Q-band/V-band. That is, a multi-band satellite communication system may provide three frequency bands of satellite coverage for an area circumscribed by a coverage perimeter. Although the frequency band triples X-band/Ku-band/Ka-band and Ka-band/Q-band/V-band are described, other frequency band triples may be provided by a multi-band satellite communication system.

In the foregoing description, embodiments of methods of providing multi-band satellite coverage are provided. The embodiments focus on optimizing a spot beam layout for a first frequency band having a higher frequency range (e.g., having smaller corresponding beamwidths) prior to providing a spot beam layout for a second frequency band. For example, the example in FIG. 6 focused on providing an initial first frequency band spot beam layout 610 prior to providing a dual-band spot beam layout 670. However, in some other embodiments (e.g., described with reference to FIG. 10), methods of providing dual-band satellite coverage may focus on optimizing a spot beam layout for a frequency band having a lower frequency range (e.g., having larger corresponding beamwidths) prior to providing a spot beam layout for a frequency band having a higher frequency range (e.g., having smaller corresponding beamwidths).

Figure 10:
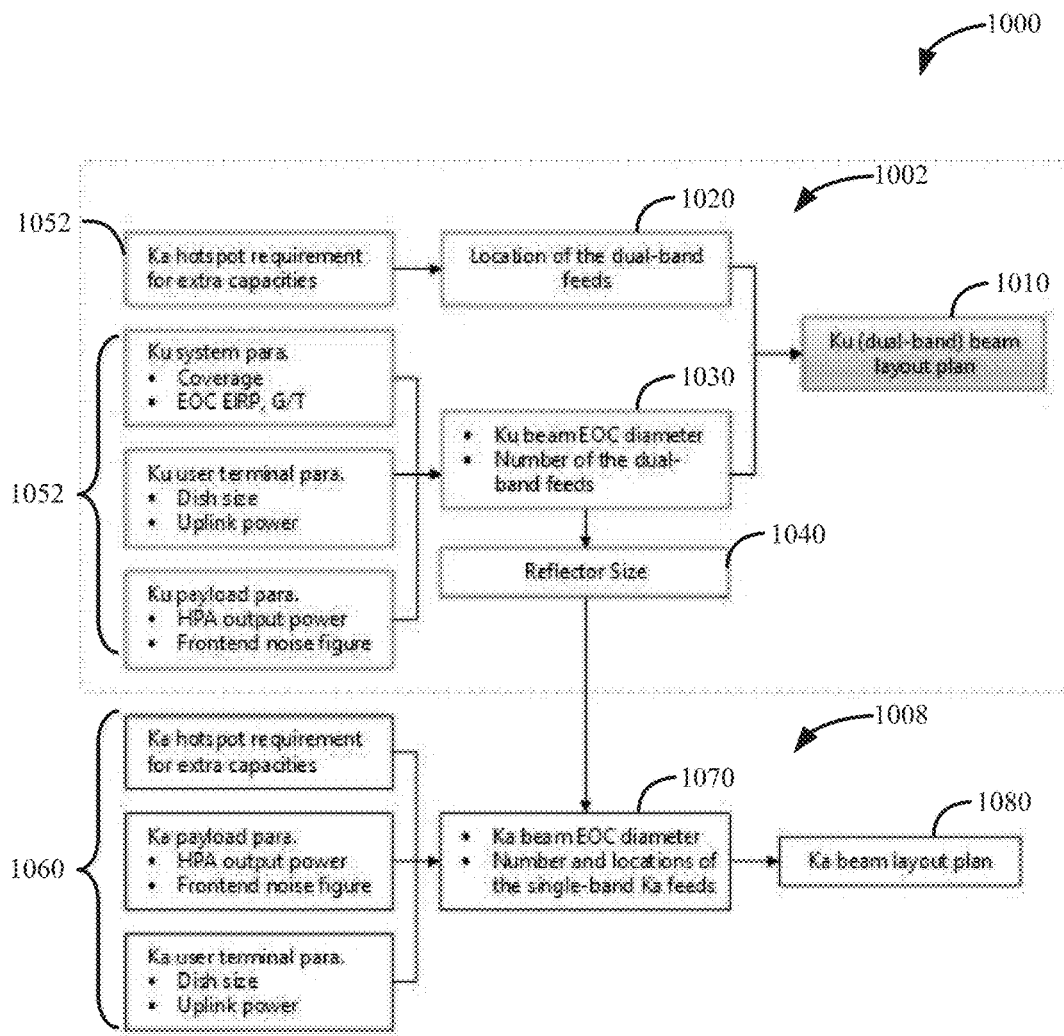
FIG. 10 is a chart illustrating a method for providing a spot beam layout in accordance with an embodiment of the present application.

Reference is now made to FIG. 10, which is a chart 1000 illustrating a method for providing a spot beam layout in accordance with an embodiment of the present application. Simultaneous reference will be made to FIG. 11, which is a spot beam layout 1100 for a satellite coverage perimeter in accordance with an embodiment of the present application. The satellite coverage perimeter for the spot beam layout 1100 of FIG. 11 may include multiple non-contiguous areas. To aid with describing the spot beam layout 1100, Ku-band spot beams and Ka-band spot beams will be used as example frequency bands.

In FIG. 10, a first portion 1002 may relate to providing a dual-band spot beam layout 1010. Dual-band spot beams may include a first frequency band spot beam (e.g., Ka-band spot beam) and a second frequency band spot beam (e.g., Ku-band spot beam). A second portion 1008 may relate to providing a first frequency band spot beam layout 1080. For example, the first frequency band spot beams may be Ka-band spot beams. According to the embodiment illustrated in the chart 1000, a dual-band spot beam layout 1010 may be generated and/or optimized prior to configuring feeds to provide a Ka-band spot beam layout 1080.

In some embodiments, the dual-band spot beam layout 1010 may be based on desired locations of dual-band spot beams 1020. High throughput demand areas may be identified. For example, Ku-band throughput demands may be identified and dual-band spot beams may be provided for providing satellite coverage to the Ku-band throughput demand areas, resulting in the dual-band spot beam layout 1010.

Figure 11:
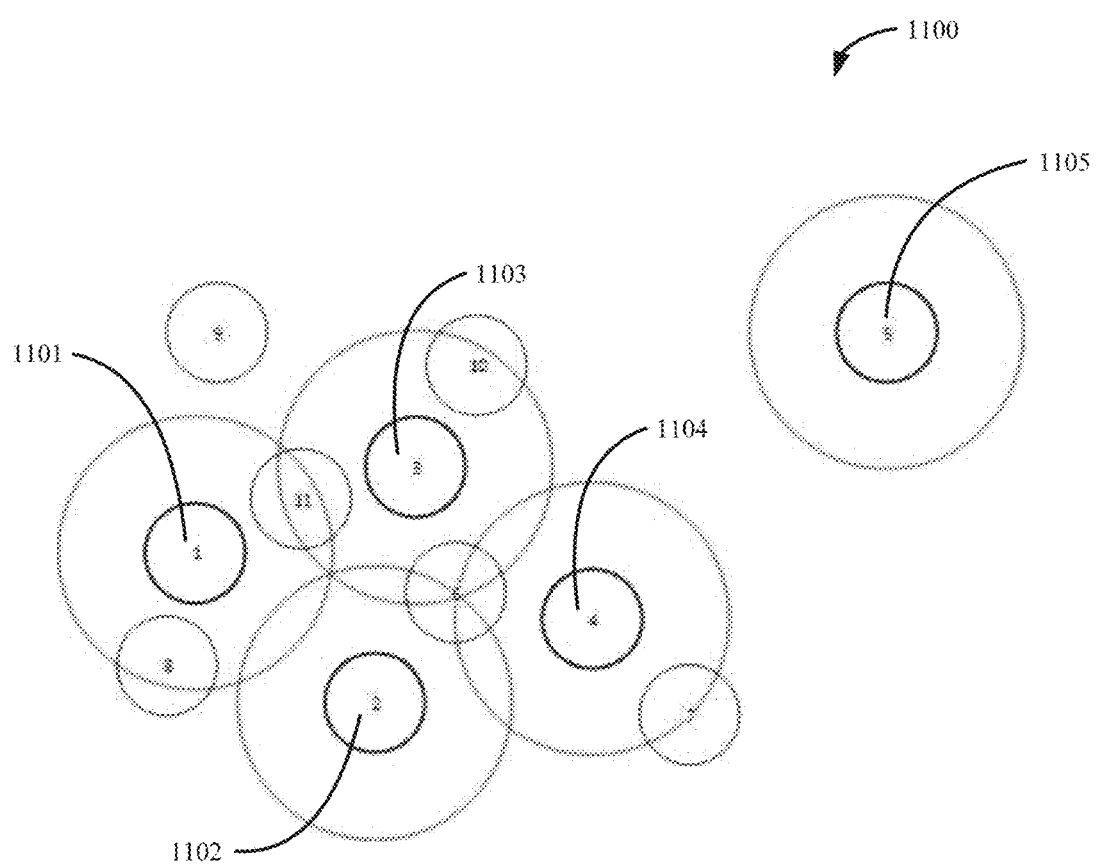
FIG. 11 is another example spot beam layout for a satellite coverage perimeter.

To illustrate, referring to FIG. 11, Ku-band high throughput demand areas may be identified and dual-band spot beams may be centered on the high throughput demand areas. A first dual-band spot beam 1101 may be provided at a first high throughput demand area, a second dual-band spot beam 1102 may be provided at a second high throughput demand area, a third dual-band spot beam 1103 may be provided at a third high throughput demand area, a fourth dual-band spot beam 1104 may be provided at a fourth high throughput demand area, and a fifth dual-band spot beam 1105 may be provided at a fifth high throughput demand area.

In some embodiments, the desired location of dual-band spot beams 1020 may be based on Ka-band hotspot requirements 1052. For example, portions of a coverage area may specifically require Ka-band satellite coverage as a back-up for handling potential spikes in throughput demand. Because dual-band spot beams may include Ku-band spot beams and Ka-band spot beams, the dual-band spot beams may be located at such identified locations.

In some embodiments, the dual-band spot beam layout 1010 may be based on a Ku-band spot beam EOC diameter (e.g., beamwidth) and the number of available multi-band feeds 250 (e.g., collectively identified as 1030). For example, the dual-band spot beam layout 1010 may be provided by taking into consideration whether a dual-band spot beam may be large enough to provide satellite for an identified high throughput demand area. If the dual-band spot beam may not be large enough to provide a Ku-band spot beam for the given high throughput demand area, the dual-band spot beam layout 1010 may allocate two or more overlapping dual-band spot beams for the given high throughput demand area. For example, the first dual-band spot beam 1101, the second dual-band spot beam 1102, the third dual-band spot beam 1103, and the fourth dual-band spot beam 1104 are illustrated in FIG. 11 as having overlapping Ku-band spot beams. Accordingly, in some embodiments, allocating one or more feeds in the array as multi-band feeds may include configuring the array to generate overlapping second frequency band spot beams for a coverage sub-area, where the coverage sub-area encircled by the overlapping second frequency band spot beams may be associated with a high throughput demand area.

In some embodiments, positioning of dual-band spot beams may depend on the number of available multi-band feeds 250. For example, if only a limited number of multi-band feeds 250 for providing dual-band spot beams are available, Ku-band spot beam coverage may be selectively provided (e.g., trade-off between satisfying coverage requirements versus number of multi-band feeds 250 available). For example, if 8 portions within a satellite coverage perimeter desire dual-band coverage, but only 5 multi-band feeds 250 may be available for generating 5 dual-band spot beams, portions within the satellite coverage perimeter having the "highest" throughput demand may be "ear-marked" as portions on which a multi-band feed 250 may generate a dual-band spot beam for.

In some embodiments, a Ku-band spot beam EOC diameter (e.g., beamwidth, identified at 1030) may be based on Ku-band payload or system parameters 1052. The Ku-band payload parameters may include high power amplifier (HPA) output power requirements and/or front end noise figure requirements. In some embodiments, the Ku-band spot beam EOC diameter may be based on Ku-band system parameters, such as coverage requirements and/or EOC, EIRP, and G/T requirements. In some embodiments, the Ku-band payload or system parameters 1052 may include Ku-band user terminal parameters, such as uplink power parameters and satellite dish size requirements.

Once a Ku-band spot beam EOC diameter and a number of multi-band feeds is determined for the dual-band spot beam layout 1010, a reflector size 1040 may be determined. Based on a required operating frequency (or frequency range) and the determined Ku-band spot beam EOC diameter, the reflector size 1040 may be determined based at least in part on the half-power beamwidth versus reflector diameter relationship illustrated in FIG. 3. Accordingly, based on: (1) selection of location of dual-band spot beams 1020 and/or (2) Ku-spot beam EOC diameter and/or number of available multi-band feeds 1030, a dual-band spot beam layout 1010 may be generated and/or optimized.

Although the reflector size 1040 is described as being based on a determined Ku-band spot beam EOC diameter, in some embodiments, the reflector size 1040 may be determined based on both a first beamwidth (e.g., Ka-band beamwidth) and a second beamwidth (e.g., Ku-band beamwidth). That is, the reflector size 1040 may be determined based on a holistic view for providing the spot beam layout 1100.

The second portion 1008 may relate to providing a first frequency band spot beam layout 1080 (e.g., Ka-band spot beam layout). In some embodiments, the first frequency band spot beam layout 1080 may be based on the Ka-band spot beam EOC diameter (e.g., beamwidth) and/or the number and locations of single band feeds 210 (e.g., collectively identified at 1070). As described, the shared reflector 260 may be used for propagating and reflecting Ka-band RF signals (e.g., first frequency band spot beams) and Ku-band RF signals (e.g., second frequency band spot beams). Because the reflector size 1040 may have been previously determined, the first beamwidth (e.g., Ka-band beamwidth) may be determined. That is, based on the operating frequency (or frequency range) of the Ka-band RF signals, a Ka-band spot beam EOC diameter may be determined based at least in part on the half-power beamwidth versus reflector diameter relationship illustrated in FIG. 3.

In some embodiments, the Ka-band spot beam EOC diameter and/or the number/locations of single-band feeds (e.g., collectively identified at 1070) may be based on Ka-band system or payload parameters 1060. For example, the Ka-band system or payload parameters 1060 may include Ka-band payload parameters such as HPA output requirements and/or front noise figure requirements. In some embodiments, the Ka-band system or payload parameters 1060 may also include Ka-band user terminal parameters, such as uplink power parameters and satellite dish size requirements.

In some embodiments, Ka-band hotspot requirements for extra capacities may also be considered for determining the Ka-band beam layout plan 1080. Additional Ka-band spot beams may be desired in locations other than the identified high throughput demand areas. Accordingly, added first frequency band spot beams (e.g., Ka-band spot beams) may be provided as a first frequency band spot beam layout 1080. For example, added first frequency band spot beams may be positioned at locations identified in FIG. 11 by numbers 6 to 11.

In some embodiments, configuring the array to include single band feeds includes providing one or more first frequency band spot beams overlapping an area encircled by overlapping second frequency band spot beams to provide dual-band coverage to a high throughput demand area. As previously discussed, the high throughput demand area may already be provided with overlapping second frequency band spot beams.

Based on the above description of FIGS. 10 and 11, in some embodiments, the chart 1000 illustrates a method for providing a dual-band spot beam layout 1010 based on identified high throughput demand areas. The dual-band spot beam layout 1010 provides dual-band spot beams that include second frequency band spot beams (e.g., Ku-band spot beams) and first frequency band spot beams (e.g., Ka-band spot beams), where the first frequency band spot beams and the second frequency band spot beams are concentric with each other. Further, the first frequency band spot beam layout 1080 provides first frequency band spot beams based on locations other than the identified high throughput demand areas. The first frequency band spot beam layout 1080 may provide supplemental satellite coverage. Accordingly, as illustrated in FIG. 11, the first frequency band spot beam layout 1080 may not comprise first frequency band spot beams (e.g., Ka-band spot beams) positioned in a contiguous manner.

Reference is now made to FIGS. 12A to 12D, which are spot beam layouts 1200A to 1200D illustrating spot beam placement based on identified high throughput demand locations, in accordance with embodiments of the present application. The spot beams may be provided by the dual-band satellite communication system 200 (FIG. 2). Dual-band spot beams may include a first frequency band spot beam (e.g., Ka-band spot beam) and a second frequency band spot beam (e.g., Ku-band spot beam). In FIGS. 12A to 12D, the first frequency band spot beams and the second frequency band spot beams are illustrated as small circles and large circles, respectively.

In some embodiments, high throughput demand areas may be localized along roads or common travel paths. For example, within an industrial area, there may be high density of satellite user terminals. Further, there may be high density of satellite user terminals travelling along a common path. For example, air planes may provide internet service to air passengers and the air planes may be equipped with satellite transceivers for transmitting and receiving RF signals. Along a common flying path, there may be a high density of satellite transceivers. To ensure high throughput demand areas are reliably serviced, methods of providing satellite coverage may take into account the identified high throughput demand areas.

Figure 12A:
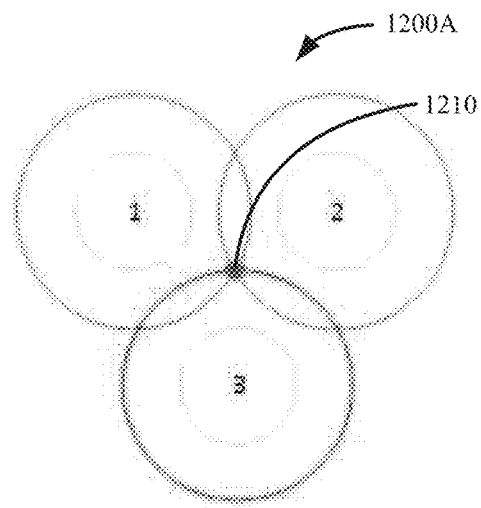
FIG. 12A illustrates a first spot beam layout in accordance with an example embodiment of the present application.

FIG. 12A illustrates a first spot beam layout 1200A having three dual-band spot beams. The dual-band spot beams, identified with numbers from 1 to 3, include a first frequency band spot beam (e.g., small spot beam circle) and a second frequency band spot beam (e.g., large spot beam circle). The first frequency band spot beam may be a Ka-band spot beam and the second frequency band spot beam may be a Ku-band spot beam. A high throughput demand area 1210 may represent an area having high density of active satellite communication devices.

As illustrated in FIG. 12A, when providing a spot beam layout, three dual-band spot beams may be arranged such that multiple second frequency band spot beams overlap or intersect at the high throughput demand area 1210. For example, three dual-spot beams may be arranged such that the Ku-band spot beams intersect at the high throughput demand area 1210. Although the high throughput demand area 1210 is illustrated as a point, the high throughput demand area 1210 may be an enlarged area. Each of the Ku-band spot beams may overlap to provide the enlarged area with Ku-band satellite coverage. Satellite communication devices located within the high throughput demand area 1210 may be serviced with Ku-band satellite coverage by any of three multi-band feeds 250 (FIG. 2) providing the three intersecting second frequency spot beams of the dual-band spot beams.

Because the first frequency band spot beam (e.g., small spot beam circle) has a beamwidth that is smaller than the second frequency band spot beam (e.g., large spot beam circle), first frequency band satellite coverage may not be provided to the identified high throughput demand area 1210. To ensure that first frequency spot beams may service the identified high throughput demand area 1210, arrays of feeds may be configured to provide first frequency band spot beams, where the first frequency band spot beams may be overlaid on the high throughput demand area 1210.

Figure 12B:
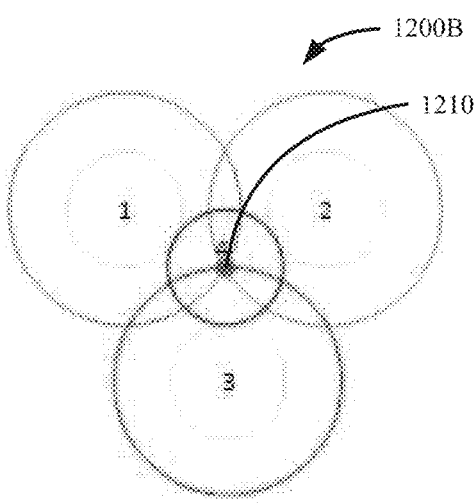
FIG. 12B illustrates a second spot beam layout in accordance with another example embodiment of the present application.

FIG. 12B illustrates a second spot beam layout 1200B providing additional spot beam coverage to the high throughput demand area 1210. The second spot beam layout 1200B may be based on the first spot beam layout 1200A and may further include a first frequency band spot beam (e.g., identified by number 4) overlaid on the high throughput demand area 1210. Accordingly, mobile data devices located within the high throughput demand area 1210 may be serviced with: (1) Ku-band satellite coverage by any one of three multi-band feeds 250 generating the three intersecting second frequency band spot beams; and/or (2) Ka-band satellite coverage by a single band feed 210 generating an overlaid first frequency band spot beam.

Figure 12C:
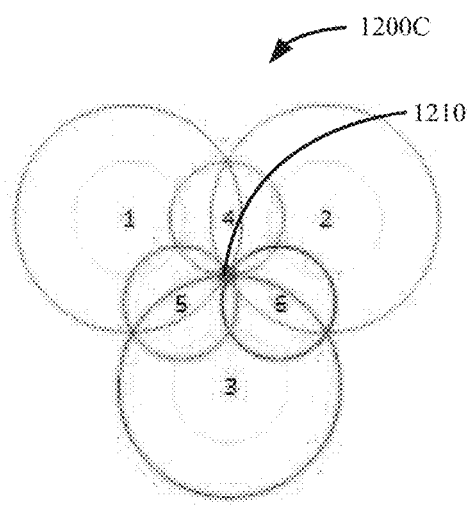
FIG. 12C illustrates a third spot beam layout in accordance with another example embodiment of the present application.

In some embodiments, to ensure the high throughput demand area 1210 may be reliably serviced with first frequency band spot beam coverage (e.g., Ka-band spot beams), three first frequency band spot beams may be configured to overlay the high throughput demand area 1210. FIG. 12C illustrates a third spot beam layout 1200C that provides additional spot beam coverage to the high throughput demand area 1210. The third spot beam layout 1200C is based on the first spot beam layout 1200A and further includes three overlaid second frequency spot beams. The three overlaid first frequency spot beams may be identified by numbers 4 to 6 and may intersect at the identified high throughput demand area 1210. In some embodiments, each of the first frequency spot beams may overlap to provide an enlarged area for intersecting second frequency spot beam coverage. Based on the third spot beam layout 1200C, mobile data devices located within the high throughput demand area 1210 may be serviced with dual-band satellite coverage by: (1) any of three multi-band feeds 250 generating the three intersecting dual-band spot beams; and/or (2) any of three single band feeds 210 generating the three intersecting first frequency band spot beams.

Figure 12D:
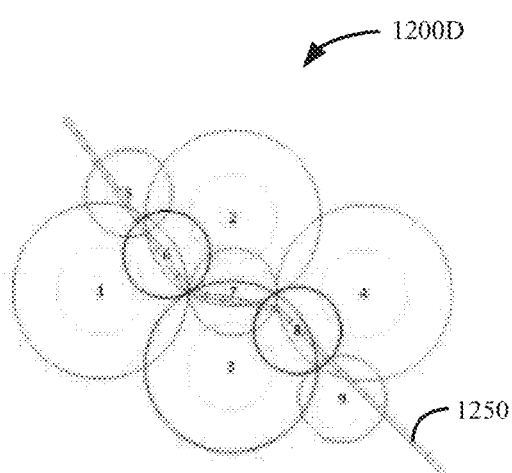
FIG. 12D illustrates a fourth spot beam layout in accordance with another example embodiment of the present application.

In some embodiments, high throughput demand locations may follow defined paths. FIG. 12D illustrates a fourth spot beam layout 1200D having four dual-band spot beams. The dual-band spot beams, identified with numbers from 1 to 4, include a first frequency band spot beam (e.g., small spot beam circle) and a second frequency band spot beam (e.g., large spot beam circle). Similar to FIGS. 12A to 12C, the first frequency band spot beam may be a Ka-band spot beam and the second frequency band spot beam may be a Ku-band spot beam. To ensure that the high throughput demand path 1250 may be reliably serviced, methods of providing dual satellite coverage may take into account the path.

As illustrated in FIG. 12D, four dual-band spot beams, identified with numbers from 1 to 4, may be arranged such that multiple second frequency spot beams overlap or intersect along portions of the high throughput demand path 1250. Satellite communication devices located or travelling along the high throughput demand path 1250 may be serviced with Ku-band satellite coverage by any one of two or more multi-band feeds 250 generating intersecting second frequency band spot beams.

Because first frequency band spot beams (e.g., small spot beam circle) has a beamwidth that may be smaller than second frequency band spot beams (e.g., large spot beam circle), first frequency band satellite coverage may not be provided to the high throughput demand path 1250. However, arrays of feeds may be configured to provide second frequency band spot beams overlaid on the high throughput demand path 1250.

Referring still to FIG. 12D, the fourth spot beam layout 1200D further includes first frequency band spot beams (e.g., identified by numbers 5 to 9) successively overlaid on the high throughput demand path 1250. In some embodiments, adjacent first frequency band spot beams may overlap. Thus, satellite communication devices located along the high throughput demand path 1250 may be serviced with: (1) Ku-band satellite coverage by any one of two or more multi-band feeds 250 generating intersecting second frequency band spot beams; and/or (2) Ka-band satellite coverage by at least one single band feed 210 generating first frequency spot beams overlaid on the high throughput demand path 1250. Accordingly, overlapping Ku-band spot beams may provide Ku-band satellite coverage service along the high throughput demand path 1250, and Ka-band spot beams overlaid along the high throughput demand path 1250 may provide Ka-band satellite coverage service.

As will be apparent from the description of the present application, embodiments of the method and satellite may provide dual-band satellite coverage for identified high throughput areas or paths while minimizing the number of multi-band feeds in a dual-band satellite communication system. That is, an array of feeds for providing spot beams may comprise both single band feeds and multi-band feeds. Multi-band feeds may cost more than single band feeds. Thus, by minimizing the number of multi-band feeds to be used, costs of the dual-band satellite communication system may be reduced.

Further, embodiments of methods for providing dual-band satellite coverage described in the present application may provide overlapping spot beams to identified high throughput areas or paths for boasting reliability and/or quality of satellite coverage service. For example, in some embodiments, allocating one or more feeds in an array of feeds as multi-band feeds may include configuring the array to provide overlapping second frequency band spot beams (e.g., Ku-band spot beams) for a coverage sub-area. The coverage sub-area encircled by the overlapping second frequency band spot beams may be associated with a high throughput demand area or path. Further, in some embodiments, configuring the array to include single band feeds may include providing one or more first frequency band spot beams (e.g., Ka-band spot beams) overlapping the area encircled by the overlapping second frequency band spot beams (see e.g., spot beam layout embodiments in FIGS. 12C and 12D).

Digital Channelizing Dual-Band Satellite Communication System

Figure 13A:
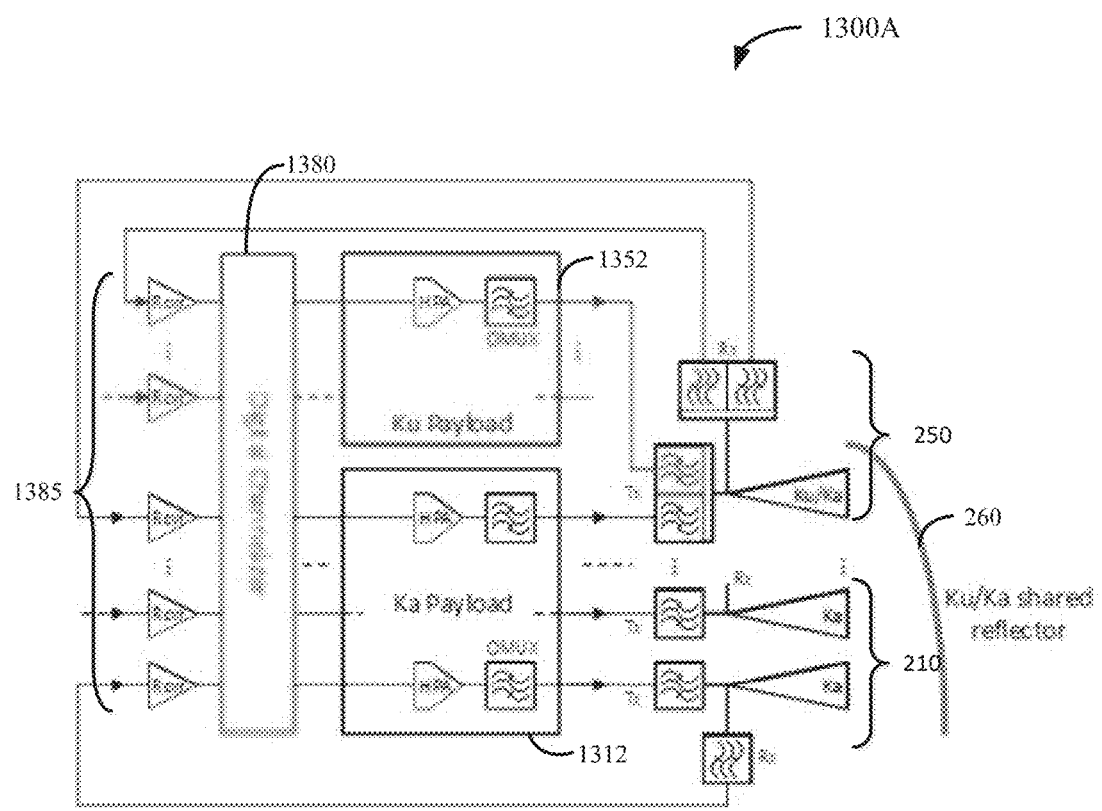
FIG. 13A is a block diagram of a digital channelizing dual-band communication satellite system in accordance with an embodiment of the present application.

In some embodiments, a satellite communication system may provide flexibility to ground terminals capable of uplink and downlink using both Ka-band and Ku-band frequencies. Reference is now made to FIG. 13A, which is a block diagram of a digital channelizing dual-band communication satellite system 1300A in accordance with an embodiment of the present application. Like reference numerals are used in FIG. 13A to denote like elements and features.

The digital channelizing dual-band communication satellite system 1300A may be based on the dual-band communication satellite system 200 of FIG. 2 and may further include a digital channelizer 1380 for routing signals among payloads for different frequency bands. For example, the digital channelizing dual-band communication satellite system 1300A may include a Ka-band payload 1312, a Ku-band payload 1352, and an array of feeds for providing spot beams for a satellite coverage perimeter. The array of feeds may include a plurality of single band feeds 210 and multi-band feeds 250. The single band feeds 210 may generate first frequency spot beams, such as Ka-band spot beams. Although only two single band feeds 210 are illustrated, the dual-band communication satellite system 200 may include any number of single band feeds 210.

In some embodiments, the multi-band feeds 250 may generate dual-band spot beams. Each dual-band spot beam may include a first frequency band spot beam and a second frequency band spot beam. The second frequency band spot beam may be concentric with the first frequency band spot beam. That is, the first frequency band spot beam may share a boresight with the second frequency band spot beam. In some embodiments, the first frequency band spot beam may be a Ka-band spot beam and the second frequency band spot beam may be a Ku-band spot beam. The digital channelizing dual-band communication satellite system 1300A may include a shared reflector 260.

As described, the digital channelizing dual-band communication satellite system 1300A may also include a digital channelizer 1380 and a plurality of receivers 1385 (e.g., low noise amplification and frequency conversion receivers). Thus, the digital channelizer 1380 may be at the Ka-payload 1312 front end and the Ku-payload 1352 front end for routing received signals from user or ground terminals. For example, a forward link (e.g., gateway to user terminal) and a return link (e.g., user terminal to gateway) may be routed to either of the Ka-payload 1312 or the Ku-payload 1352. Accordingly, the forward link and/or return link may be routed to either of first frequency band spot beams or second frequency band spot beams.

With increasing throughput demands on satellite systems, Ka-band payloads for providing spot beams may be increasingly useful. However, heavy rain in coastal regions of countries such as China, India, Singapore, Malaysia, or Indonesia (e.g., such as ITU Region 3 countries) may cause RF signal links operating in the Ka-band of frequencies to drop or to be severed. Ku-band frequencies may be useful for mitigating fading effects caused by heavy rain or other weather conditions. Accordingly, a digital channelizing dual-band communication satellite system 1300A providing spot beam layouts for two or more frequency bands may facilitate data paths among alternate frequency bands to counteract unwanted weather related effects. The digital channelizer 1380 may facilitate inter-frequency band connectivity among spot beams in a spot beam layout.

Figure 13B:
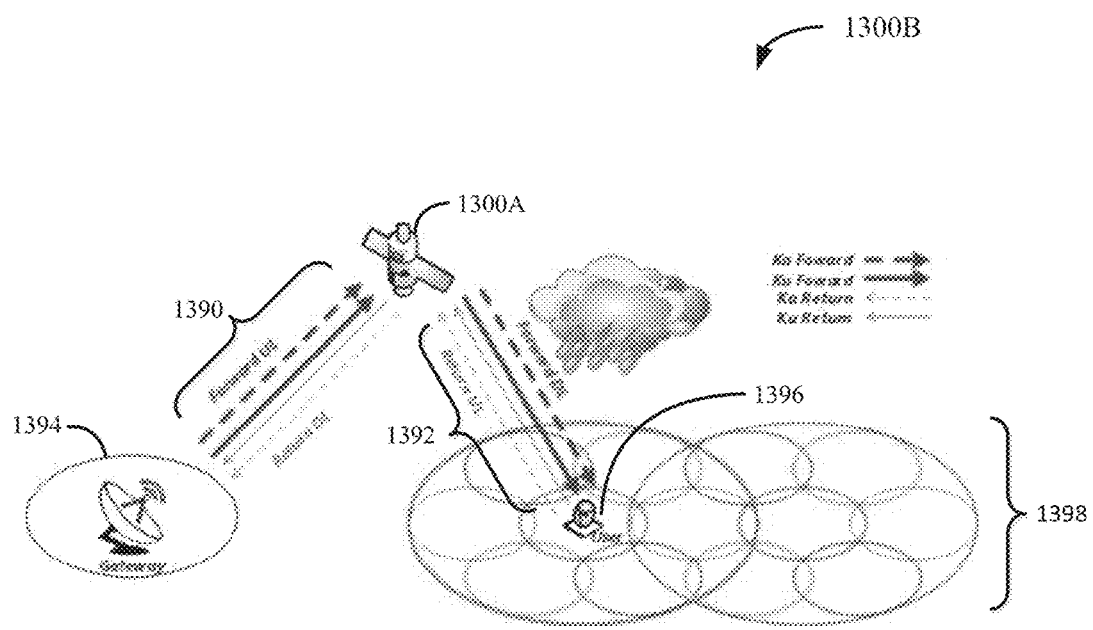
FIG. 13B is a block diagram of a Ku-band/Ka-band satellite system for mitigating effects caused by heavy rain.

Reference is now made to FIG. 13B, which is a system diagram illustrating Ku-band/Ka-band links for rain fade mitigation. A satellite system 1300B may include a digital channelizing dual-band communication satellite system 1300A, a gateway terminal 1394 and a user terminal 1396. Data transmission between the gateway 1394 and the user terminal 1396 may be provided using "two hops" including a forward hop and a return hop. The forward hop may include propagation of a signal from the gateway 1394 to the user terminal 1396. For example, the forward hop may include the forward uplink (e.g., gateway 1394 to satellite 1300A) and the forward downlink (e.g., satellite 1300A to user terminal 1396). The return hop may include propagation of a signal from the user terminal 1396 to the gateway 1394. For example, the return hop may include the return uplink (e.g., user terminal 1396 to satellite 1300A) and the return downlink (e.g., satellite 1300A to gateway 1394). Both Ku-band and Ka-band frequencies may include forward and return links.

Described another way, in some embodiments, the satellite system 1300B may include gateway links 1390, where the gateway links 1390 include forward uplink and return downlink paths for both Ka-band and Ku-band frequencies between the gateway terminal 1394 and the digital channelizing dual-band communication satellite system 1300A. Similarly, the satellite system 1300B may include user links 1392, where the user links 1392 include forward downlink and return uplink paths 1392 for both Ka-band and Ku-band frequencies between the user terminal 1396 and the digital channelizing dual-band communication satellite system 1300A. The digital channelizing dual-band communication satellite system 1300A may provide one or more Ka/Ku-band spot beam layouts 1398 for providing dual-band satellite coverage.

In FIG. 13B, the user terminal 1396 may be located at the center of a dual-band spot beam. If the user terminal 1396 were capable of operating on Ka-band and Ku-band frequencies, during heavy rain or any other weather condition that may cause degradation or severance of a satellite link, the digital channelizing dual-band communication satellite system 1300A may be able to route RF signals from one of the frequency bands (e.g., Ka-band or Ku-band) to another frequency band (e.g., Ku-band or Ka-band) to mitigate undesirable effects from extreme weather.

In some embodiments, the digital channelizer 1380 (FIG. 13A) may, for example, provide beam connection routing capability according to any one of the following example combinations: (1) Ku-band uplink, Ku-band downlink; (2) Ka-band uplink, Ka-band downlink; (3) Ku-band uplink, Ka-band downlink; and/or (4) Ka-band uplink, Ku-band downlink.

In some other embodiments, the digital channelizer 1380 may facilitate uplink transmission of data using a first frequency band spot beam (e.g., Ka-band spot beam) and facilitate downlink transmission of a subset or portion of data using the first frequency band spot beam (e.g., Ka-band spot beam) and further facilitate a remaining portion of data using a second frequency band spot beam (e.g., Ku-band spot beam). The configuration of uplink and downlink transmission of data described above may be useful when a downlink capacity of a first frequency band spot beam may be near full capacity. Thus, a second frequency band spot beam may assist for facilitating downlink transmission and thereby expanding overall satellite transmission capacity. Accordingly, the digital channelizer 1380 may, for example, provide beam connection routing capability according to any one of the following example combinations: 1) Ku-band uplink, partial Ku-band downlink and partial Ka-band downlink; and/or 2) Ka-band uplink, partial Ka-band downlink and partial Ku-band downlink.

In a further illustrating example, a radio frequency signal may be uplinked at a first frequency band (e.g., Ka-band frequency). The radio frequency signal may then be downlinked at a second frequency band (e.g., Ku-band frequency). The first frequency may be different than the second frequency (see e.g., example embodiments in U.S. patent application Ser. No. 13/569,980, published as U.S. Patent Application Publication No. 2014/0045420 A1). Accordingly, in some embodiments, the digital channelizer 1380 (FIG. 13) may facilitate data uplink and data downlink on a first frequency band and a second frequency band, respectively, using a multi-band feed 250 that generates a dual-band spot beam.

In some embodiments, user terminals 1396 may be equipped to operate with one frequency band. For example, legacy vehicles may still be equipped with satellite equipment for one of the Ka-band or the Ku-band. Accordingly, the digital channelizing dual-band communication satellite system 1300A may adaptively determine what frequency band a user terminal 1396 may be capable of sending and receiving RF signals with and subsequently facilitate data transmission using a frequency band that may be supported by the user terminal 1396.

It will be apparent that embodiments of digital channelizing dual-band communication satellite systems 1300A described in the present application may be able to adaptively facilitate transmission and receipt of RF signals using frequencies of multiple frequency bands. In one embodiment, to mitigate undesirable effects caused by heavy rain or other weather conditions on Ka-band frequencies, embodiments of digital channelizing dual-band communication satellite systems 1300A may route signals to Ku-band frequencies, and maintain reliable communication links. Further, it will be apparent that embodiments of digital channelizing dual-band communication satellite systems 1300A may adaptively route signals using frequency bands that may be supported by ground or user terminals. Thus, the digital channelizing dual-band communication satellite systems 1300A may be capable of transmitting and receiving signals to and from a wider range of user terminals having different frequency band capabilities.

Frequency Reuse Plans

In a spot beam layout, spot beams may experience co-channel interference from contiguous or adjacent spot beams in a spot beam layout. For example, signals within a first spot beam may experience interference from an adjacent spot beam operating within the same frequency band. In some embodiments, however, co-channel interference between contiguous or adjacent spot beams may be mitigated using a "multi-color" frequency reuse scheme.

Figure 14A:
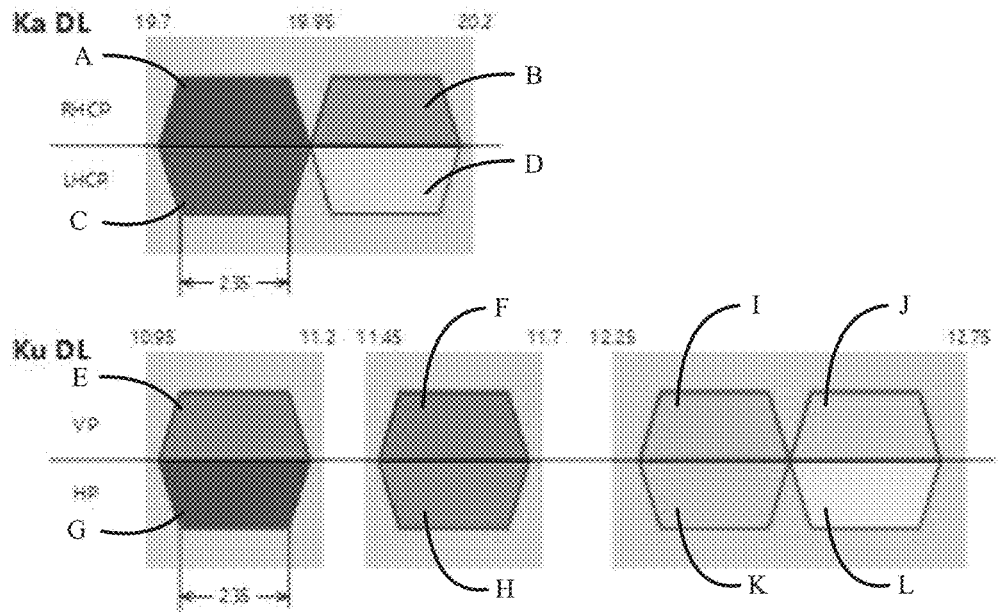
FIG. 14A is an illustration of a Ka-band 4-color and a Ku-band 8-color frequency reuse plan for a Ka/Ku-band spot band layout in accordance with an embodiment of the present application.

Reference is now made to FIG. 14A, which is an illustration of a Ka-band 4-color and a Ku-band 8-color reuse frequency plan for a dual Ka/Ku-band spot band layout. For the Ka-band, a standard 4-color frequency reuse plan may be adopted. For the Ku-band, up to an 8-color reuse scheme may be adopted to compensate for any performance degradations that may be caused by use of multi-band feeds.

Figure 14B:
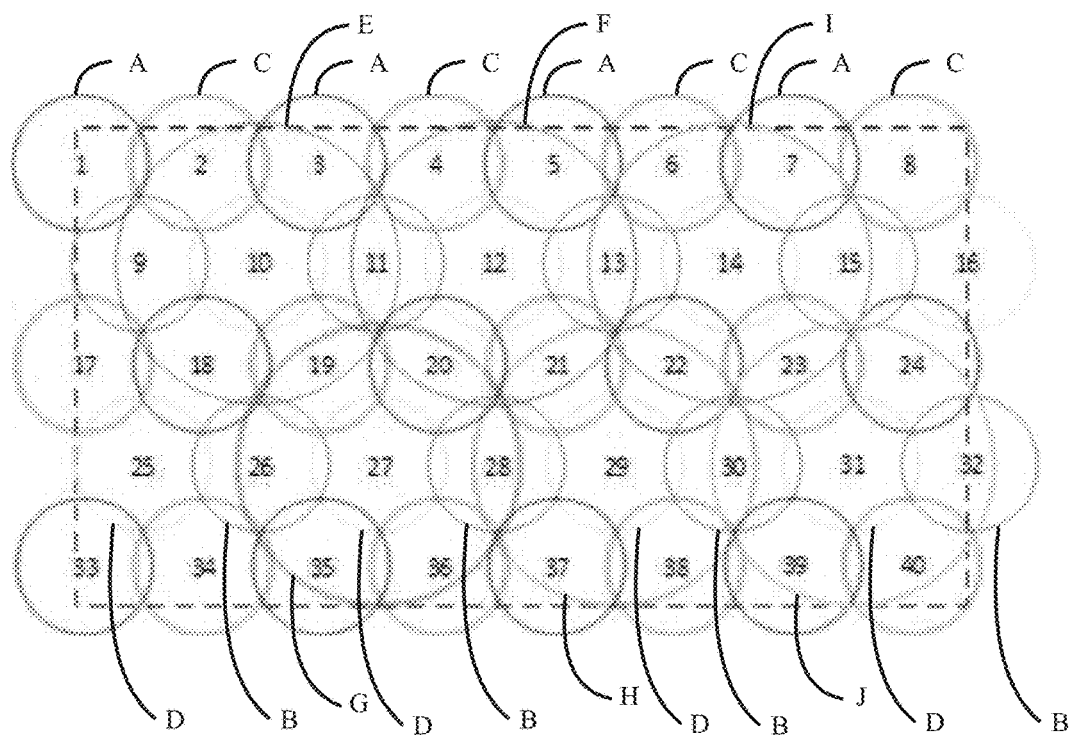
FIG. 14B is the spot beam layout of FIG. 4 illustrated using the Ka-band 4-color and the Ku-band 8-color frequency reuse plan of FIG. 14A.

FIG. 14B is a spot beam layout of FIG. 4 illustrated using a Ka-band 4-color and a Ku-band 8-color reuse frequency plan of FIG. 14A. Dual-band spot beams may be provided by multi-band feeds 250. Dual-band spot beams may be illustrated and identified in FIG. 14B with numbers 10, 12, 14, 27, 29, and 31.

As illustrated, co-channel interference may be mitigated by using a 4-color reuse frequency plan for the Ka-band spot beams provided by single band feeds 210 (e.g., Ka-band spot beams numbered from 1 to 40). For example, four colors may be represented by the letters A to D (FIGS. 14A and 14B). As illustrated in FIG. 14B, adjacent Ka-band spot beams may utilize a different color in the color frequency reuse plan. An adjacent spot beam may utilize a different frequency range and polarization. Specifically, spot beams 1 to 8, 17 to 24, and 33 to 40 may be represented by alternating colors identified by A and B. Spot beams 9 to 16 and 25 to 32 may be represented by alternating colors identified by C and D.

Similarly, 8 colours may be represented by the letters E to L (FIGS. 14A and 14B). As illustrated in FIG. 14B, adjacent Ku-band spot beams may utilize a different color in the color frequency reuse plan. Specifically, the second frequency band spot beam in the dual-band spot beam identified by the number 10 may include a Ku-band spot beam represented by a color designated by the letter E. The second frequency band spot beam in the dual-band spot beam identified by the number 12 may include a Ku-band spot beam represented by a color designated by the letter F. The second frequency band spot beam in the dual-band spot beam identified by the number 14 may include a Ku-band spot beam represented by a color designated by the letter I. The second frequency band spot beam in the dual-band spot beam identified by the number 27 may include a Ku-band spot beam represented by a color designated by the letter G. The second frequency band spot beam in the dual-band spot beam identified by the number 29 may include a Ku-band spot beam represented by a color designated by the letter H. Further, second frequency band spot beam in the dual-band spot beam identified by the number 31 may include a Ku-band spot beam represented by a color designated by the letter J.

In the illustrated 4-color Ka-band and 8-color Ku-band frequency reuse scheme, Ku-band spot beams reuse 235 MHz of usable bandwidth out of the 1 GHz Ku-band downlink bands, thereby reducing the co-channel interference in a 4-color frequency reuse scheme.

Figure 15:
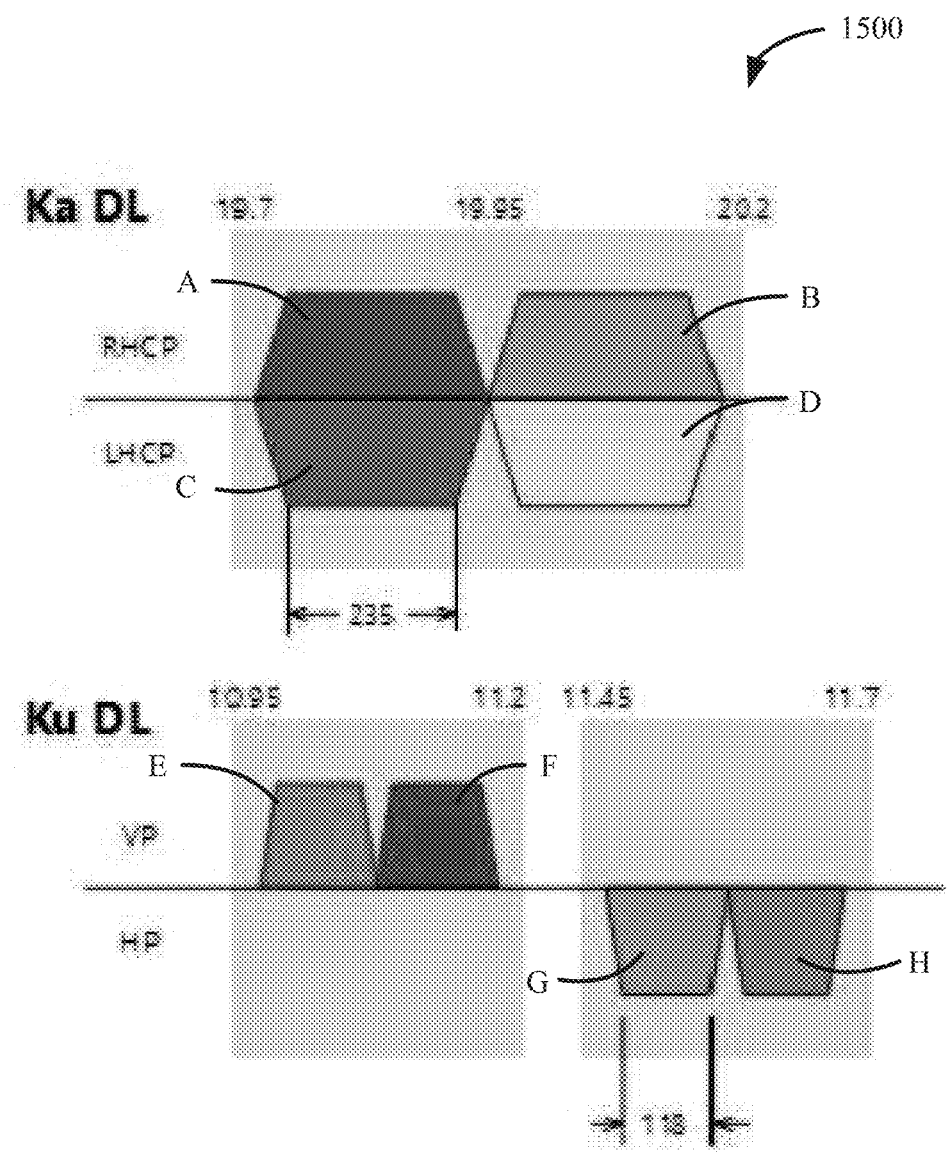
FIG. 15 is an illustration of a Ka-band and Ku-band 4-color reuse frequency plan in accordance with an embodiment of the present application.

Reference is now made to FIG. 15, which is an example Ku-band and Ka-band 4-color frequency reuse plan for a dual-band communication satellite system in accordance with an embodiment of the present application. The colors of the frequency reuse plan may be represented by the letters A to H. For example, Ku-beams may adopt a 4-color frequency reuse scheme for the Ku-extended bands. Even though the usable frequency band for each color may be 118 MHz, there may be no cross-polarization interference present. The frequency reuse plan may also increase the overall carrier-to-noise ratio and improve satellite system throughput.

Figure 16A:
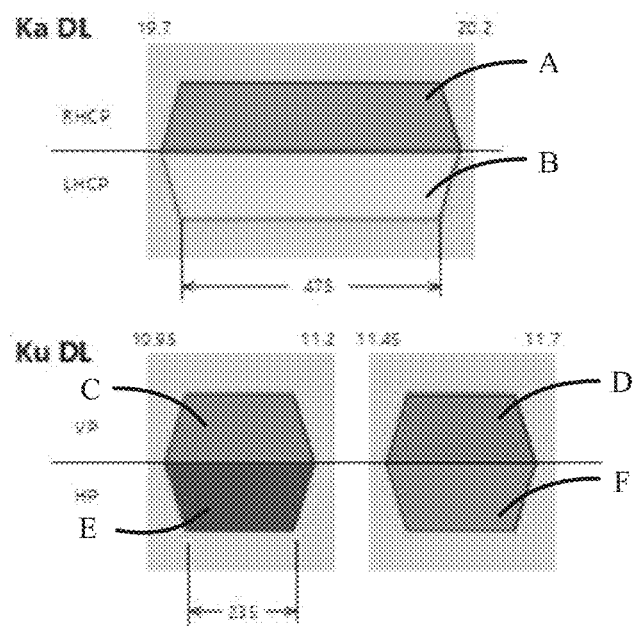
FIG. 16A is an illustration of a Ka-band 2-color and a Ku-band 4-color frequency reuse plan for a Ka/Ku-band spot band layout in accordance with an embodiment of the present application.
Figure 16B:
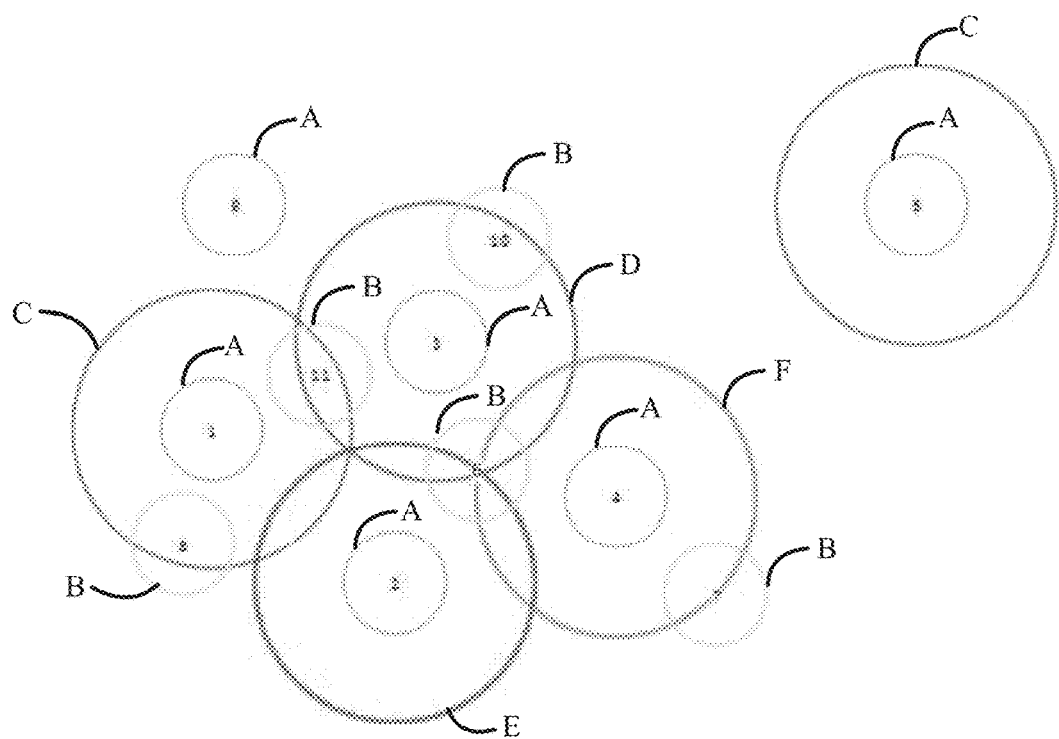
FIG. 16B is the spot beam layout of FIG. 11 illustrated using the Ka-band 2-color and the Ku-band 4-color frequency reuse plan of FIG. 16A.

Reference is now simultaneously made to FIGS. 16A and 16B. FIG. 16A is an illustration of a Ka-band 2-color and a Ku-band 4-color frequency reuse plan for a dual Ka/Ku-band spot band layout in accordance with an embodiment of the present application. FIG. 16B is a spot beam layout of FIG. 11 illustrated using the Ka-band 2-color and the Ku-band 4-color frequency reuse plan of FIG. 16A. As previously described with reference to FIG. 11, dual-band spot beams may be provided and centered on high throughput demand areas, identified by numbers 1 to 5. As illustrated, the dual-band spot beams centered on numbers 1 to 4 may each provide a second frequency band spot beam (e.g., Ku-band spot beam) and the second frequency band spot beam from each of the dual-band spot beams identified by numbers 1 to 4 may be adjacent and may overlap.

In some embodiments, co-channel interference may be mitigated by using the Ka-band 2-color and Ku-band 4-color frequency reuse plan. For example, 2 colors may be represented by letters A and B for the Ka-band and 4 colors may be represented by letters C to F. To mitigate co-channel interference among the contiguous first frequency band spot beams, the color frequency re-use plan illustrated in FIG. 16A may be employed. That is, adjacent spot beams may utilize a different frequency range and polarization.

Further, in the spot beam layout of FIGS. 11 and 16B, a first frequency band spot beam layout (e.g., Ka-band spot beam layout) includes non-contiguous Ka-band spot beams. A frequency reuse scheme utilizing fewer colors (e.g., 2-color) may be adapted.

Figure 17:
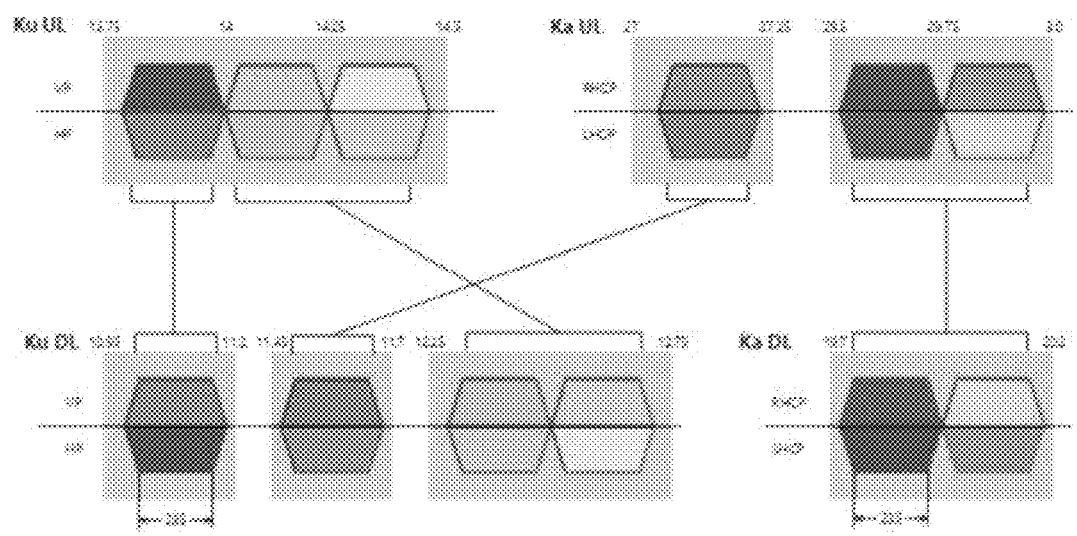
FIG. 17 is a frequency plan for mitigating an uplink/downlink frequency spectrum imbalance issue for a dual Ka/Ku-band satellite communication system in accordance with an embodiment of the present application.

Reference is now made to FIG. 17, which is a frequency plan for mitigating an uplink/downlink frequency spectrum imbalance issue for a dual Ka/Ku-band satellite communication system in accordance with an embodiment of the present application. The Ka-band frequency spectrum may have greater frequency resource compared to the Ku-band frequency spectrum. The digital channelizing dual-band satellite communication system 1300A of FIG. 13 may mitigate the aforementioned uplink/downlink frequency spectrum imbalance issue.

For example, in the ITU Region-3, the total downlink frequency spectrum for the standard and extended Ku-band may be 1 GHz per polarization. In contrast, the uplink frequency spectrum may comprise 750 MHz per polarization. Thus, if the Ku-band frequencies are designed to employ symmetric uplink/downlink traffic flow, a 250 MHz sub-range shortage may exist for each polarization. With the digital channelizing dual-band satellite communication system 1300A of FIG. 13, however, a 250 MHz frequency sub-range from the Ka-band spectrum may be allocated to the Ku-band uplink range of frequencies to balance the additional 250 MHz user downlink frequency sub-range for the Ku-band. Thus, the dual-band frequency plan illustrated in FIG. 17 may mitigate the aforementioned uplink/downlink frequency spectrum imbalance issue. That is, in some embodiments, the first frequency band may be the Ka-band and the second frequency band may be the Ku-band. The Ku-band may be configured to provide symmetric uplink/downlink throughput. Accordingly, digitally channelizing the spectrum of dual-band frequencies may include allocating a range of frequencies from an uplink Ka-band for use as an uplink Ku-band of frequencies.

Other Example Dual-Band Communication Satellite Systems

The number of feeds that may be placed near a parabolic reflector focus point may be limited. For example, if the number of feeds placed near a parabolic reflector focus point is large, significant distortions to beam gain may be introduced. In addition, cross-polarization performance issues may result. Accordingly, in some embodiments, a dual-band communication satellite system having numerous feeds may include two or more reflectors for propagating and receiving signals from the numerous feeds.

Figure 18:
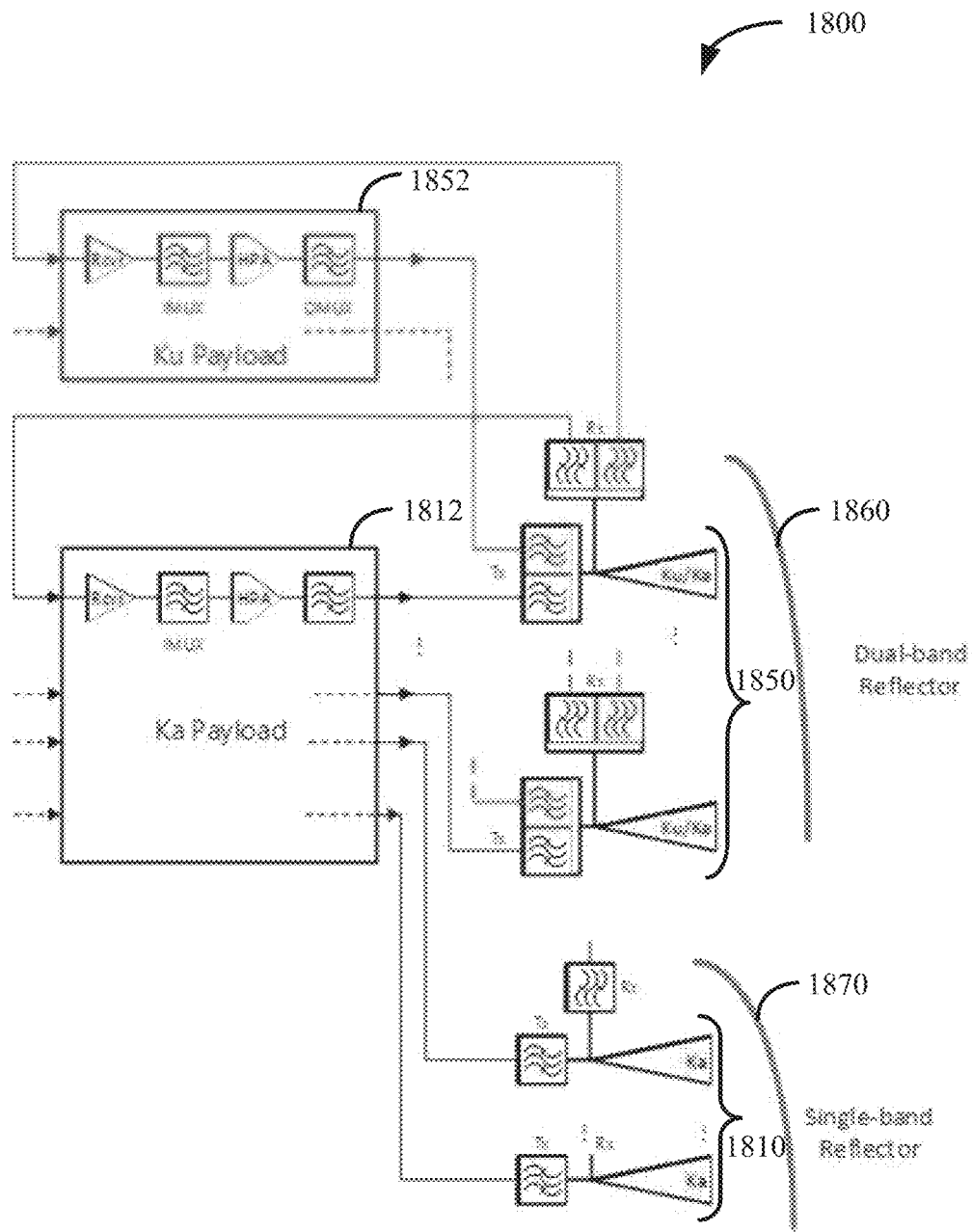
FIG. 18 is a block diagram of a dual-band communication satellite system in accordance with another embodiment of the present application.

Reference is now made to FIG. 18, which is a block diagram of a dual-band communication satellite system 1800 in accordance with another embodiment of the present application. The dual-band communication satellite system 1800 may include a Ka-band payload 1812 and a Ku-band payload 1852. The dual-band communication satellite system 1800 may also include an array of feeds for providing spot beams for a satellite coverage perimeter. The array of feeds may include a plurality of single band feeds 1810 and multi-band feeds 1850. The single band feeds 1810 may be similar to the single band feeds 210 described with reference to FIG. 2. The multi-band feeds 1850 may be similar to the multi-band feeds 250 described with reference to FIG. 2.

The dual-band communication satellite system 1800 may also include a dual-band reflector 1860 and a single-band reflector 1870. In some embodiments, the multi-band feeds 1850 may transmit and receive signals using the dual-band reflector 1860. That is, the dual-band reflector 1860 may propagate and receive RF signals for both Ka-band frequencies and Ku-band frequencies. It will be appreciated that the dual-band reflector 1860 may be for any other frequency bands.

The single-band reflector 1870 may propagate and receive RF signals for Ka-band frequencies. Accordingly, in some embodiments, single band feeds 1810 (e.g., Ka-band feeds) may be grouped into a cluster and may transmit and receive signals using the single-band reflector 1870. Multi-band feeds 1850 may be grouped into a different cluster and may transmit and receive signals using the dual-band reflector 1860. In some embodiments, the dual-band reflector 1860 and the single band reflector 1870 may have different sizes. That is, where the dual-band communication satellite system 1800 includes two or more shared reflectors, a shared reflector in the two or more shared reflectors may be different in size than another shared reflector in the two or more shared reflectors.

In some embodiments, the dual-band communication satellite system 1800 may include one or more single band reflectors 1870. That is, one or more first shared reflectors may be for the plurality of single band feeds 1810. In some embodiments, the dual-band communication satellite system 1800 may include one or more dual-band reflectors 1860. That is, one or more second shared reflectors may be for the plurality of multi-band feeds 1850. In some embodiments, the one or more first shared reflectors may be different in size than the one or more second shared reflectors.

Figure 19:
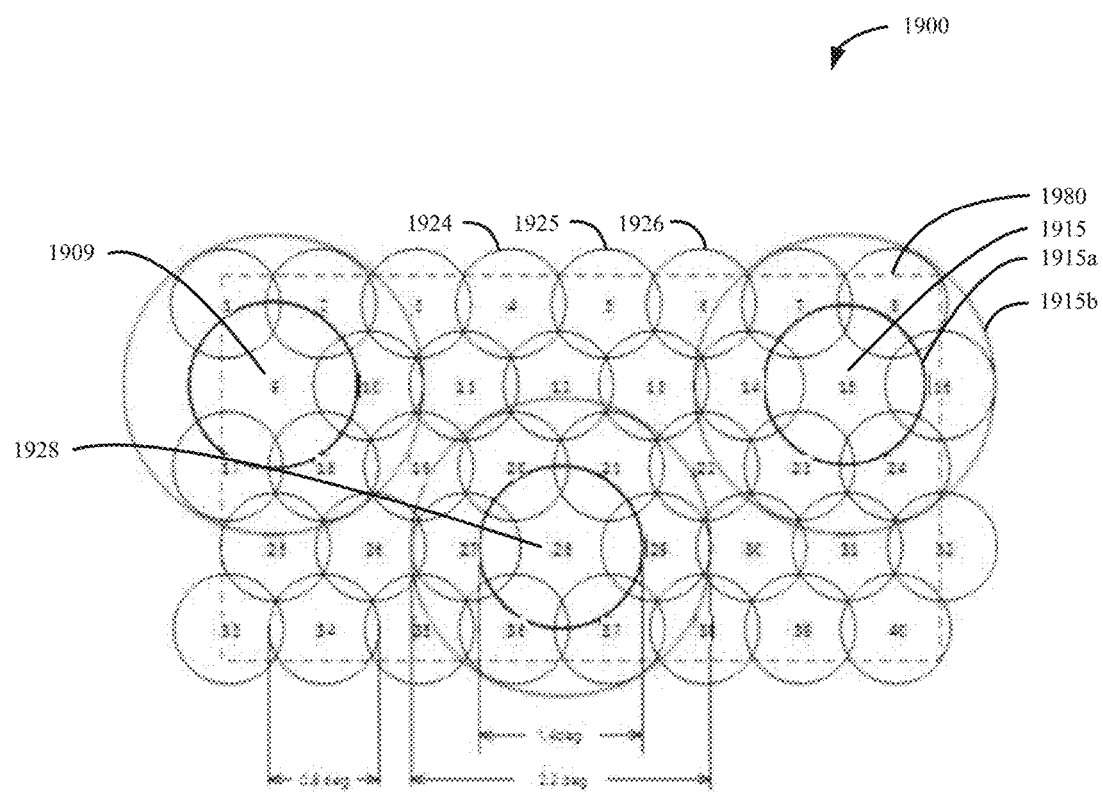
FIG. 19 is another example spot beam layout for a satellite coverage perimeter.

Reference is now made to FIG. 19, which is another example spot beam layout 1900 for a satellite coverage perimeter 1980 in accordance with an embodiment of the present application. The spot beam layout 1900 may include spot beams for Ka-band and Ku-band frequencies. The spot beam layout 1900 may be provided by the dual-band communication satellite system 1800 described with reference to FIG. 18. The desired satellite coverage perimeter 1980 is illustrated by dashed lines and may be a rectangular perimeter. Although the satellite coverage perimeter 1980 is illustrated as a rectangular perimeter, the desired satellite coverage perimeter 1980 may be any other shape or combination of shapes.

Similar to the spot beam layout 700 described with reference to FIG. 7, the spot beam layout 1900 of FIG. 19 may include first frequency band spot beams and second frequency band spot beams. For example, first frequency band spot beams may be Ka-band spot beams and second frequency band spot beams may be Ku-band spot beams. The spot beam layout 1900 of FIG. 19 may be generated by a plurality of single band feeds 1810 (FIG. 18) and multi-band feeds 1850 (FIG. 18). The multi-band feeds 1850 may each generate a first frequency band spot beam (e.g., Ka-band spot beam) and a second frequency band spot beam (e.g., Ku-band spot beam).

Similar to the spot beam layout 700 illustrated in FIG. 7, in the spot beam layout 1900 of FIG. 19, three multi-band feeds 1850 may generate three dual-band spot beams. For example, a multi-band feed 1850 may generate a dual-band spot beam 1915 indicated at a location identified by the number 15. The dual-band spot beam 1915 may include a first frequency band spot beam 1915a (small circle) and a second frequency band spot beam 1915b (large circle). In FIG. 19, three dual-band spot beams are illustrated and indicated at locations identified by the numbers 9, 15, and 28. For example, a first dual-band spot beam 1909, a second dual-band spot beam 1915, and a third dual-band spot beam 1928 are illustrated.

In addition to the three illustrated dual-band spot beams in FIG. 19, the spot beam layout 1900 may also include a plurality of additional first frequency band spot beams (e.g., Ka-band spot beams). A plurality of single band feeds 1810 may generate the plurality of additional first frequency band spot beams at locations indicated by numbers 1 to 8, 10 to 14, 16 to 27, and 29 to 40. For ease of illustration, three first frequency band spot beams generated by single band feeds 1810 have been identified, such as fourth spot beam 1924, fifth spot beam 1925, and sixth spot beam 1926.

In the spot beam layout 1900 of FIG. 19, the first frequency band spot beams (e.g., Ka-band spot beams) generated by single band feeds 1810 may have a different beamwidth than the first frequency band spot beams generated by multi-band feeds 1850. For example, Ka-band spot beams generated by single band feeds 1810 may have a 0.8 degrees beamwidth, while Ka-band spot beams generated by multi-band feeds 1850 may have a 1.4 degrees beamwidth. In some embodiments, as the dual-band reflector 1860 (FIG. 18) and the single-band reflector 1870 (FIG. 18) may have different sizes, some Ka-band spot beams generated by multi-band feeds 1850 may have a different beamwidth than another Ka-band spot beam generated by single band feeds 1810. For example, a Ka-band spot beam 1915a generated by a multi-band feed 1850 may have a 1.4 degrees beamwidth while a Ka-band spot beam 1924 generated by a single band feed 1810 may have a 0.8 degrees beamwidth. Accordingly, the spot beam layout 1900 of FIG. 19 may include multiple Ka-band spot beams having two different beamwidths.

In some embodiments, Ka-band beamwidths may be derived based on the Ka-band system parameters, such as EOC, EIRP, and G/T requirements and/or targeted user or ground terminal size. Once Ka-band beamwidths are determined, respective reflector sizes, such as reflector sizes for dual-band reflectors 1860 and single-band reflectors 1870, may be determined based at least in part on the half-power beamwidth versus reflector diameter relationship illustrated in FIG. 3.

Figure 20:
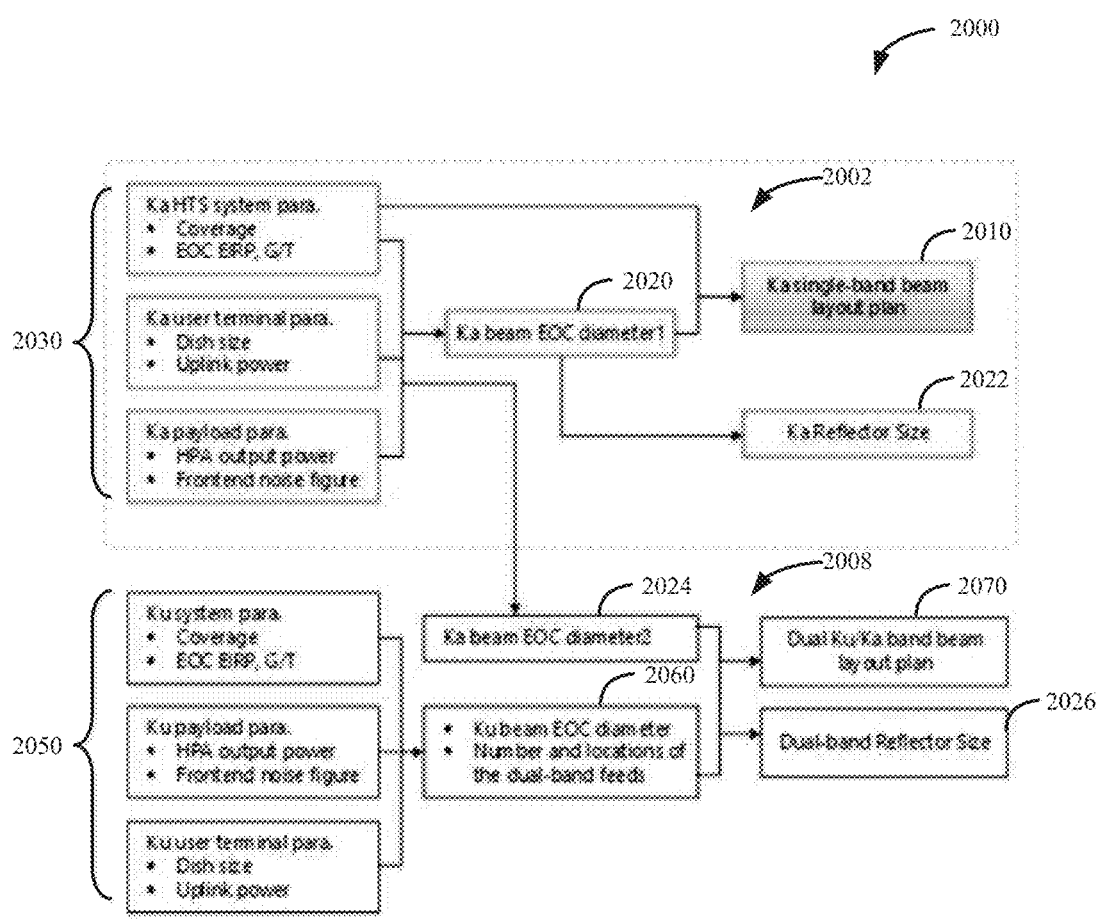
FIG. 20 is a chart illustrating details for providing spot beam layouts in accordance with another embodiment of the present application.

Reference is now made to FIG. 20, which is a chart 2000 illustrating details for providing spot beam layouts in accordance with another embodiment of the present application. Similar to the chart described with reference to FIG. 6, a first portion 2002 may relate to a Ka-band spot beam layout plan 2010 and a second portion 2008 may relate to a dual Ku/Ka-band spot beam layout plan 2070.

Similar to the chart described with reference to FIG. 6, in some embodiments, the first frequency band spot beam layout 2010 may be based on Ka-band system parameters 2030, such as coverage requirements and/or EOC, EIRP, and G/T requirements. In some embodiments, the first frequency band spot beam layout 2010 may also be based on a first frequency band beamwidth, such as a first Ka-band spot beam EOC diameter 2020. The first Ka-band spot beam EOC diameter 2020 may be associated with single-band feeds 1810 (FIG. 18). For example, the first Ka-band spot beam EOC diameter 2020 may be 0.8 degrees (see e.g., FIG.

19). Once the first Ka-band spot beam EOC diameter 2020 is determined, a single-band reflector 1870 size may be determined based at least in part on the half-power beamwidth versus reflector diameter relationship illustrated in FIG. 3.

As described, the second portion 2008 may relate to a dual Ku/Ka-band spot beam layout plan 2070. Similar to the chart 600 illustrated with reference to FIG. 6, the dual Ku/Ka-band spot beam layout plan 2070 may be based on a Ku-band spot beam EOC diameter and a determination of the number and sequence order of multi-band feeds (collectively identified in FIG. 20 as 2060). The Ku-band spot beam EOC diameter and the determination of the number and sequence order of multi-band feeds may be based on Ku-band system parameters 2050. The Ku-band system parameters 2050 may be similar to the Ku-band system parameters 650 identified with reference to FIG. 6.

Further, the dual Ku/Ka-band spot beam layout plan 2070 may also be based on a second Ka-band spot beam EOC diameter 2024. The second Ka-band spot beam EOC diameter 2024 may also be determined based on Ka-band system parameters 2030, such as coverage requirements and/or EOC, EIRP, and G/T requirements. For example, the second Ka-band spot beam EOC diameter 2024 may be 1.4 degrees (see e.g., FIG. 19). Accordingly, as was illustrated in FIG. 19, Ka-band spot beams generated by single-band feeds 1810 (FIG. 18) may have a different beamwidth than Ka-band spot beams generated by multi-band feeds 1850 (FIG. 18).

Referring still to FIG. 20, the dual Ku/Ka-band spot beam layout plan 2070 may be based on both the second Ka-band spot beam EOC diameter 2024 and Ku-band variables (collectively identified as 2060). Similarly, a dual-band reflector 1860 (FIG. 18) may have a size based on both the second Ka-band spot beam EOC diameter 2024 and Ku-band variables (collectively identified as 2060).

In some embodiments, a beamwidth for a second frequency band spot beam (e.g., Ku-band spot beam) may be determined after the dual-band reflector size 2026 is determined. That is, the dual-band reflector size 2026 may not be determined based on a beamwidth for the second frequency band spot beam (e.g., Ku-band spot beam).

Although one single-band reflector 1870 (FIG. 18) having a Ka-band reflector size 2022 and one dual-band reflector 1860 (FIG. 18) having a dual-band reflector size 2026 is described with reference to FIG. 20, embodiments of the present application may include two or more single-band reflectors 1870 and two or more dual-band reflectors 1860.

In some embodiments where the satellite coverage perimeter may include non-contiguous areas (see e.g., spot beam layout 1100 described with reference to FIG. 11), a spot beam layout may have first frequency band spot beams (e.g., Ka-band spot beams) generated by single band feeds 1810 (FIG. 18) with a different beamwidth than first frequency band spot beams (e.g., Ka-band spot beams) generated by multi-band feeds 1850 (FIG. 18). As an example, a spot beam layout that may be similar to the spot beam layout 1100 of FIG. 11 may include multiple Ka-band spot beams having two different beamwidth sizes. For example, a first group of Ka-band spot beams (illustrated in FIG. 11 at locations 1 to 5) generated by multi-band feeds 1850 may have a different beamwidth than Ka-band spot beams (illustrated in FIG. 11 at locations 6 to 11) generated by single band feeds 1010.

Based on the foregoing examples, a dual-band communication satellite system may include two or more reflectors. A reflector or a group of reflectors may be sized for a cluster of feeds. One cluster of feeds may include Ka-band feeds and a second cluster of feeds may also include Ka-band feeds. Each cluster of feeds may propagate and receive RF signals from differently sized reflectors. Accordingly, in some embodiments, a dual-band communication satellite system may generate a plurality of Ka-band spot beams, where some Ka-band spot beams may have a beamwidth different than a second group of Ka-band spot beams. The different beamwidths may be generated as long as each group of Ka-band spot beams meet Ka-band system parameters, such as EOC, EIRP, and G/T requirements.

Example embodiments of the present disclosure are not limited to any particular type of satellite or antenna.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A satellite system for providing dual-band satellite coverage using a spot beam layout for a satellite coverage perimeter, the system comprising:
   an array of feeds, the array including:
      a plurality of single band feeds, the single band feeds generating first frequency band spot beams, and
      one or more multi-band feeds each generating a first frequency band spot beam and a second frequency band spot beam concentric with the first frequency band spot beam for collectively providing the dual-band satellite coverage, the first frequency band spot beam having a different beamwidth than the second frequency band spot beam, wherein the number of multi-band feeds is different than the number of single band feeds; and
   a shared reflector for the array of feeds.

2. The system of claim 1, wherein the shared reflector is for at least one single band feed and at least one multi-band feed.

3. The system of claim 1, wherein the shared reflector is for each of the plurality of single band feeds and for each of the one or more multi-band feeds in the array of feeds.

4. The system of claim 1, wherein the system includes two or more shared reflectors, and wherein each shared reflector is the same size as another shared reflector in the two or more shared reflectors, and wherein a first shared reflector is for the plurality of single band feeds and a second shared reflector is for the one or more multi-band feeds.

5. The system of claim 1, wherein the system includes two or more shared reflectors, and wherein one or more first shared reflectors are for the plurality of single band feeds and one or more second shared reflectors are for the one or more multi-band feeds, and wherein the one or more first shared reflectors are different in size than the one or more second shared reflectors.

6. The system of claim 1, wherein the system includes two or more shared reflectors, and wherein a first shared reflector in the two or more shared reflectors is different in size than another shared reflector in the two or more shared reflectors.

7. The system of claim 1, wherein the first frequency band spot beam has a first beamwidth and the second frequency band spot beam has a second beamwidth, and wherein the shared reflector has a reflector size, and wherein the reflector size is based on at least one of the first frequency band spot beam or the second frequency band spot beam.

8. The system of claim 1, wherein the array of feeds collectively provides the spot beam layout having two or more International Telecommunication Union (ITU) defined frequency bands, and wherein the single band feeds are Ka frequency band feeds and the multi-band feeds are dual Ka/Ku frequency band feeds.

9. The system of claim 1, wherein the number of multi-band feeds is less than the number of single band feeds.

10. The system of claim 1, further comprising a digital channelizer to channelize a digitized spectrum of dual-band frequencies to route uplink or downlink signal transmissions to one of a first frequency band or a second frequency band, the spectrum of dual-band frequencies including frequencies of the first frequency band and frequencies of the second frequency band.

11. The system of claim 1, wherein the one or more multi-band feeds provides multi-band spot beams, each of the multi-band spot beams including a first frequency band spot beam, a second frequency band spot beam, and a third frequency band spot beam,
and wherein each of the first frequency band spot beam, the second frequency band spot beam, and the third frequency band spot beam being concentric with another of first frequency band spot beam, the second frequency band spot beam, and the third frequency band spot beam.

12. A method for providing dual-band satellite coverage using a spot beam layout for a satellite coverage perimeter, the method comprising:
determining a reflector size for an array of feeds, the array generating first frequency band spot beams, each first frequency band spot beam having a first beamwidth;
configuring the array to include single band feeds to generate the first frequency band spot beams for the satellite coverage perimeter;
based on the determined reflector size, determining a second beamwidth for second frequency band spot beams, the second beamwidth being different than the first beamwidth; and
allocating one or more feeds in the array as multi-band feeds to generate dual-band spot beams, each of the dual-band spot beams including a first frequency band spot beam and a second frequency band spot beam concentric with the first frequency band spot beam for collectively providing the dual-band satellite coverage, wherein the number of multi-band feeds is different than the number of single band feeds.

13. The method of claim 12, wherein the number of the multi-band feeds providing the dual-band spot beams is less than the number of the single band feeds providing the first frequency spot beams.

14. The method of claim 12, wherein determining the second beamwidth is based on the determined reflector size and a second frequency band EOC peak-to-edge gain delta requirement.

15. The method of claim 12, wherein the array of feeds collectively provides the spot beam layout having two or more International Telecommunication Union (ITU) defined frequency bands, and wherein the first frequency band spot beams are Ka frequency band spot beams, and wherein the second frequency band spot beams are Ku frequency band spot beams.

16. The method of claim 12, wherein the first frequency band spot beams and the second frequency band spot beams correspond to a frequency band pair, and wherein the frequency band pair is one of C-band/Ku-band or Ka-band/Q-band.

17. The method of claim 12 further comprising:
based on the determined reflector size, determining a third beamwidth for third frequency band spot beams, the third beamwidth being different than the first beamwidth and the second beamwidth; and
allocating one or more feeds in the array to generate multi-band spot beams, each of the multi-band spot beams including a first frequency band spot beam, a second frequency band spot beam, and a third frequency band spot beam,
and wherein each of the first frequency band spot beam, the second frequency band spot beam, and the third frequency band spot beam being concentric with another of the first frequency band spot beam, the second frequency band spot beam, and the third frequency band spot beam.

18. The method of claim 17, wherein the first frequency band spot beams, the second frequency band spot beams, and the third frequency band spot beams correspond to a frequency band triple, and wherein the frequency band triple is one of X-band/Ku-band/Ka-band or Ka-band/Q-band/V-band.

19. The method of claim 12, wherein configuring the array to generate the first frequency band spot beams includes configuring the array to maximize the area within the satellite coverage perimeter having first frequency band spot beam coverage.

20. The method of claim 12, wherein allocating one or more feeds in the array as multi-band feeds includes configuring the array to generate overlapping second frequency band spot beams for a coverage sub-area, wherein the coverage sub-area is associated with a high throughput demand area.

21. The method of claim 20, wherein configuring the array to include single band feeds includes generating one or more first frequency band spot beams overlapping the coverage sub-area encircled by the overlapping second frequency band spot beams to provide dual-band coverage to the high throughput demand area.

22. The method of claim 12, wherein the second beamwidth is larger than the first beamwidth, and wherein allocating one or more feeds in the array to generate dual-band spot beams comprises:
identifying portions within the coverage perimeter requiring dual-band coverage; and
selecting non-adjacent feeds in the array as multi-band feeds to generate the required dual-band coverage for the coverage perimeter.

23. The method of claim 12, further comprising digitally channelizing a spectrum of dual-band frequencies to route uplink or downlink signal transmissions to one of a first frequency band or a second frequency band, the spectrum of dual-band frequencies including frequencies of the first frequency band and frequencies of the second frequency band.

24. The method of claim 23, wherein the first frequency band is the Ka-band and the second frequency band is the Ku-band, and wherein the Ku-band is configured to provide symmetric uplink/downlink throughput, and wherein digitally channelizing the spectrum of dual-band frequencies includes allocating a range of frequencies from an uplink Ka-band for use as an uplink Ku-band of frequencies.

* * * * *